US011687347B2

(12) United States Patent
Tran

(10) Patent No.: US 11,687,347 B2
(45) Date of Patent: Jun. 27, 2023

(54) MICROPROCESSOR AND METHOD FOR SPECULATIVELY ISSUING LOAD/STORE INSTRUCTION WITH NON-DETERMINISTIC ACCESS TIME USING SCOREBOARD

(71) Applicant: ANDES TECHNOLOGY CORPORATION, Hsinchu (TW)

(72) Inventor: Thang Minh Tran, Tustin, CA (US)

(73) Assignee: ANDES TECHNOLOGY CORPORATION, Hsinchu (TW)

( * ) Notice: Subject to any disclaimer, the term of this patent is extended or adjusted under 35 U.S.C. 154(b) by 65 days.

(21) Appl. No.: 17/329,181

(22) Filed: May 25, 2021

(65) Prior Publication Data

US 2022/0382547 A1 Dec. 1, 2022

(51) Int. Cl.
*G06F 9/38* (2018.01)
*G06F 9/30* (2018.01)
*G06F 13/16* (2006.01)

(52) U.S. Cl.
CPC ........ *G06F 9/3838* (2013.01); *G06F 9/30043* (2013.01); *G06F 9/30145* (2013.01); *G06F 13/1668* (2013.01)

(58) Field of Classification Search
CPC ............................ G06F 9/3838; G06F 9/30043
See application file for complete search history.

(56) References Cited

U.S. PATENT DOCUMENTS

| 5,630,149 | A | * | 5/1997 | Bluhm | ................... | G06F 9/3838 |
| | | | | | | 712/217 |
| 5,664,215 | A | * | 9/1997 | Burgess | ................ | G06F 9/3816 |
| | | | | | | 712/E9.046 |
| 11,163,582 | B1 | * | 11/2021 | Tran | ......................... | G06F 9/223 |
| 11,204,770 | B2 | * | 12/2021 | Tran | ...................... | G06F 9/3838 |
| 2006/0259747 | A1 | * | 11/2006 | Gonzalez | .............. | G06F 9/3897 |
| | | | | | | 712/226 |

(Continued)

FOREIGN PATENT DOCUMENTS

| CN | 107078959 | 11/2020 |
| CN | 113467830 | 10/2021 |

(Continued)

OTHER PUBLICATIONS

"Office Action of Taiwan Counterpart Application", dated Nov. 22, 2022, p. 1-p. 13.

*Primary Examiner* — Andrew Caldwell
*Assistant Examiner* — Kasim Alli
(74) *Attorney, Agent, or Firm* — JCIPRNET

(57) ABSTRACT

A microprocessor and a method for issuing a load/store instruction is introduced. The microprocessor includes a decode/issue unit, a load/store queue, a scoreboard, and a load/store unit. The scoreboard includes a plurality of scoreboard entries, in which each scoreboard entry includes an unknown bit value and a count value, wherein the unknown bit value or the count value is set when instructions are issued. The decode/issue unit checks for WAR, WAW, and RAW data dependencies from the scoreboard and dispatches load/store instructions to the load/store queue with the recorded scoreboard values. The load/store queue is configured to resolve the data dependencies and dispatch the load/store instructions to the load/store unit for execution.

19 Claims, 19 Drawing Sheets

(56) References Cited

U.S. PATENT DOCUMENTS

| | | | | |
|---|---|---|---|---|
| 2007/0204135 A1* | 8/2007 | Jiang | ................ | G06F 9/3824 |
| | | | | 712/E9.046 |
| 2014/0354644 A1* | 12/2014 | Nystad | ................ | G06F 9/30 |
| | | | | 345/506 |
| 2015/0220341 A1* | 8/2015 | Ohannessian, Jr. | ................ | |
| | | | | G06F 9/30087 |
| | | | | 712/217 |

FOREIGN PATENT DOCUMENTS

| WO | 2012138957 | 10/2012 |
|---|---|---|
| WO | 2016105967 | 6/2016 |

* cited by examiner

| 1511 | 1515 | 1513 |
|---|---|---|
| Unknown | funit | cnt |
| 0 | FMAC | 3 |
| 0 | ALU | 6 |
| 1 | ... Load ... | x |
| 2 | Load | x |
| 2 | Load | x |

151(after) ← ; 1510(S) ←

| 1521 | 1523 |
|---|---|
| Unknown | read_cnt |
| 0 | 2 |
| 1 | x |
| 0 | ... 7 ... |
| 1 | x |
| 1 | x |

152(after) ← ; 1520(S) ←

FIG. 10B

| 1511 | 1515 | 1513 |
|---|---|---|
| Unknown | funit | cnt |
| 0 | FMAC | 0 |
| 0 | x | x |
| 1 | Load | x |
| 2 | Load | x |
| 2 | Load | x |

151(after) ↑    1510(Z)

| 1521 | 1523 |
|---|---|
| Unknown | read_cnt |
| 0 | 1 |
| 1 | x |
| 0 | 6 |
| 2 | x |
| 1 | x |

152(after) ↑    1520(Z)

FIG. 11B

| 1511 | 1515 | 1513 |
|---|---|---|
| Unknown | funit | cnt |
| 0 | FMAC | 2 |
| 0 | ALU | 8 |
| ... | ... | ... |
| 1 | Load | x |
| ... | ... | ... |
| 2 | Load | x |
| 2 | Load | x |

151(after) ↗  
1510(T)

| 1521 | 1523 |
|---|---|
| Unknown | read_cnt |
| 0 | 2 |
| 0 | 1 |
| ... | ... |
| 0 | 7 |
| 1 | x |
| 1 | x |

152(after) ↗  
1520(T)

FIG. 12B

| 1511 | 1515 | 1513 |
|---|---|---|
| Unknown | funit | cnt |
| 0 | FMAC | 1 |
| 0 | ALU | 7 |
| 1 | Load | x |
| 3 | Load | x |
| 2 | Load | x |

151(after) ↑   1510(U)

| 1521 | 1523 |
|---|---|
| Unknown | read_cnt |
| 0 | 1 |
| 0 | 0 |
| 0 | x |
| 1 | x |
| 1 | x |

152(after) ↑   1520(U)

| | | | | | | | | |
|---|---|---|---|---|---|---|---|---|
| Mops | 0 | 1 | 2 | 3 | 4 | 5 | 6 | 7 |
| vd | v24 | v25 | v26 | v27 | v28 | v29 | v30 | v31 |
| unk_ld | 1 | 1 | 1 | 0 | 2 | 2 | 0 | 0 |
| unk_st | 0 | 0 | 0 | 0 | 1 | 1 | 1 | 1 |
| Pre_cnt | 2 | 2 | 2 | 2 | 2 | 2 | 2 | 2 |

| | | | | |
|---|---|---|---|---|
| Mops | 0 | 1 | 2 | 3 |
| vd | v20 | v21 | v22 | v23 |
| unk_ld | 0 | 0 | 1 | 1 |
| unk_st | 1 | 1 | 0 | 0 |
| Pre_cnt | 2 | 2 | 2 | 2 |

290E(1)

MICROPROCESSOR AND METHOD FOR SPECULATIVELY ISSUING LOAD/STORE INSTRUCTION WITH NON-DETERMINISTIC ACCESS TIME USING SCOREBOARD

BACKGROUND

Technical Field

The disclosure generally relates to a microprocessor, and more specifically, to a method and a microprocessor that is capable of speculatively issuing a load/store instruction.

Description of Related Art

Superscalar microprocessors achieve high performance by executing multiple instructions per clock cycle and by out-of-order execution of instructions. The instructions must write back to the register file in-order to avoid the control hazards such as branch misprediction, interrupt, and precise exception. Temporary storages such as re-order buffer, register renaming are used to the result data until they can be retired in-order to the register file. Furthermore, storages are needed to keep the source operand data in execution queues until the instruction can be executed by the functional unit. These storages are often multiple times the size of the architectural register file and reading/writing of these storages consume much more power.

In term of performance, the most impactful and difficult instructions in the pipeline microprocessor are load and store instructions. An instruction with known latency and throughput times can be scheduled for execution at a specific future time. However, the load/store instructions have unknown latency time due to TLB miss, cache miss and conflicts. For the load instruction, load data can be returned in the next cycle or many cycles later, and early write back of load data violates data dependency such as a write-after-write (WAW) data dependency and a write-after-read (WAR) data dependency. For a store instruction, store data from the register file are read in the next cycle or many cycles later, and early reading of store data violates data dependency such as a read-after-write (RAW) data dependency. When a load/store instruction has data dependency, the load/store instruction is stalled in a decode/issue unit until the data dependency is resolved. The stalling of the load/store instruction in the decode/issue unit may reduce performance of the microprocessor.

SUMMARY

The disclosure introduces a microprocessor and a method for speculatively issuing a load/store instruction using a scoreboard for the registers in the register file.

In some embodiments, the microprocessor includes a scoreboard which keeps track of the latency and read times for all instructions with known latency and read times. The microprocessor issues the instructions to execution queues with preset read times to read data from a number of read ports of the register file and preset write times to write data to a number of write ports of the register file. The load instruction has unknown latency time can be issued, executed, and written back to the register file with dedicated write port(s). The store instruction may have unknown read time can be issued and read data from the register file with dedicated read port(s). The scoreboard checks for data dependency and stalls load and store instructions in the decode/issue unit if there is WAW, WAR, or RAW data dependencies. The stalled load/store instructions in the decode/issue stage stop the instruction stream from making progress. In embodiments of this invention, the load/store instructions are dispatched to the load/store execution queue where the load/store instructions monitor the read and write ports in order to clear the data dependency status. The scoreboard bits are copied to the load/store execution queue allowing the subsequent instructions in the instruction stream to move forward. The subsequent instructions without data dependencies on load/store instructions can be issued and executed thus improving the microprocessor performance. The data dependencies of the load/store instructions are resolved in the load/store execution queue and dispatched to the load/store execution unit once the data dependencies are resolved. In another embodiment, the load/store instructions include vector load/store instructions where each vector instruction can have a plurality of micro-operations and each micro-operation can independently resolve its own data dependency in order for dispatching to the load/store unit for execution. The scoreboard includes a plurality of bits for the unknown field. The multi-bit unknown field allows a number of load/store instructions to be dispatched to the execution queue.

The method that is adapted to a microprocessor that include a scoreboard and a load/store queue, wherein the scoreboard includes a plurality of scoreboard entries, and each of the plurality of scoreboard entries comprises a plurality of unknown bits value and a count value. The method includes a step of issuing a load/store instruction to the load/store queue with the unknown bit value and the count value of the scoreboard based on a destination register or a source register of the load/store instruction. The issuing of the load/store instruction is based on the destination register of the load/store instruction if the load/store instruction is a first load instruction; and the issue of the load/store instruction is based on the source register of the load/store instruction if the load/store instruction is a first store instruction.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 10A-10B are diagrams illustrating an operation of issuing a store instruction having a RAW data dependency with known access time in accordance with some embodiments.

FIGS. 11A and 11B are diagrams illustrating an operation of issuing a store operation having a RAW data dependency with unknown access time in accordance with some embodiments.

FIGS. 12A and 12B are diagrams illustrating an operation of issuing a store operation having a WAR data dependency with known access time in accordance with some embodiments.

FIGS. 13A and 13B are diagrams illustrating an operation of issuing a load instruction having a RAW data dependency with unknown access time in accordance with some embodiments.

FIGS. 14A-14C are diagrams illustrating vector load/store instructions in accordance with some embodiments of the disclosure.

DESCRIPTION OF THE EMBODIMENTS

Figure 1:
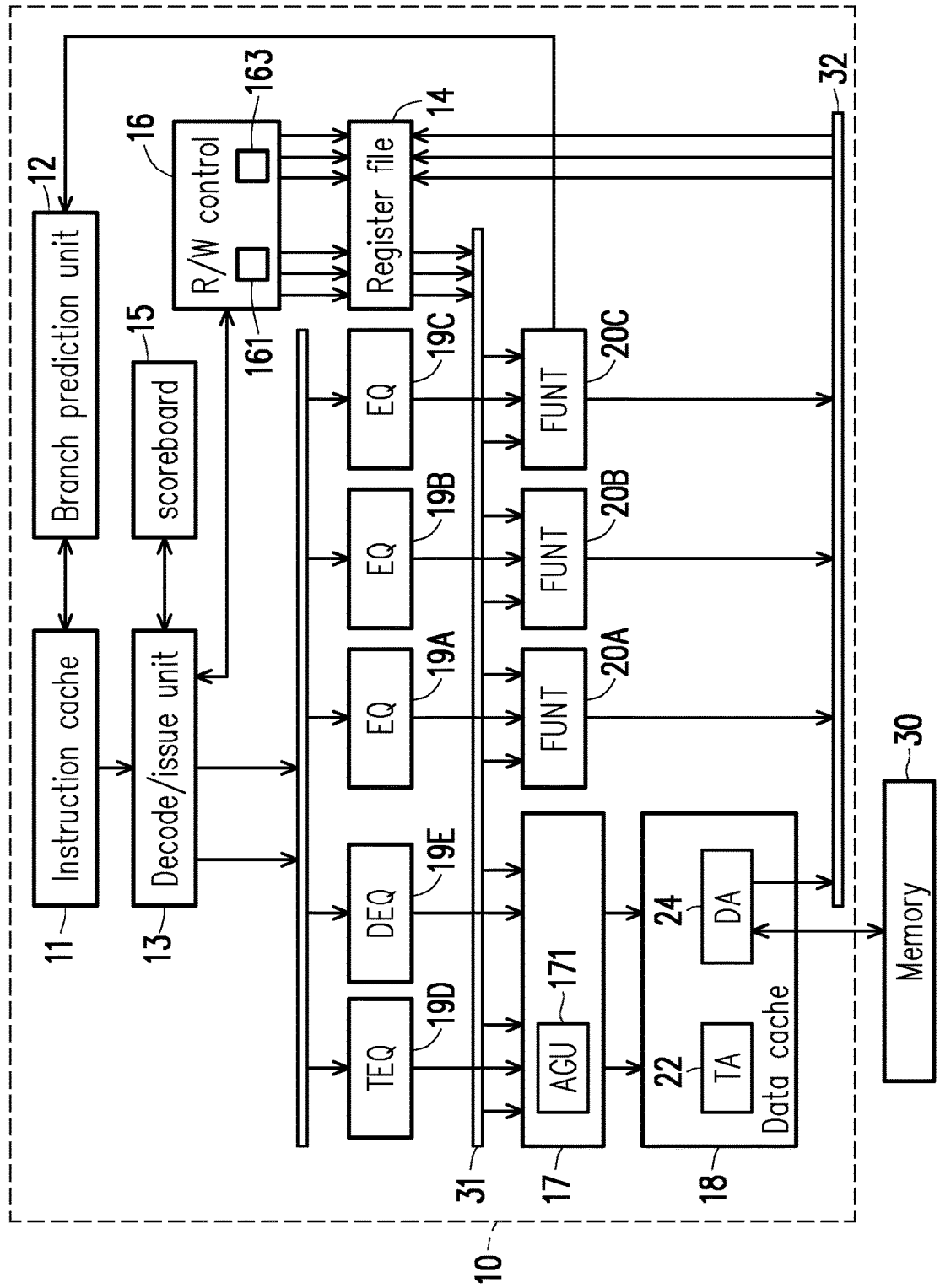
FIG. 1 a block diagram illustrating a data processing system in accordance with some embodiments.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The disclosure introduces a microprocessor that schedules instructions to a future time for execution, rather than stalling a pipeline. Such processor may also be referred to as a future scheduling execution (FSE) microprocessor. Conventionally, if a register or a functional unit designated by an instruction is not ready (e.g., resource conflict such as data dependency, availability of read and write ports of the register, availability of the functional unit, etc.), the decode/issue unit would stall the execution pipeline or put aside the instruction until the availability of the register or functional unit is resolved. In the FSE microprocessor, the decode/issue unit would still issue and schedule these instructions to a future time for execution based on resolving the data dependency, availability of the read and write ports of the register and functional unit at that future time.

The load/store instructions may be stalled in decode/issue unit due to unknown latency and read times of the register. In the disclosure, a data execution queue coupled between the decode/issue unit and the load/store unit is configured to handle the load/store instruction having unknown access (write or read) time. Instead of stalling the pipeline, the load/store instruction may be issued and scheduled for execution by issuing the load/store instruction with scoreboard values to the data execution queue.

Referring to FIG. 1, a schematic diagram of a data processing system 1 including a microprocessor 10 and a memory 30 is illustrated in accordance with some embodiments. The microprocessor 10 is implemented to perform a variety of data processing functionalities by executing instructions stored in the memory 30. The memory 30 may include level 2 (L2) and level 3 (L3) caches and a main memory of the data processing system 1, in which the L2 and L3 caches has faster access times than the main memory. The memory may include at least one of random access memory (RAM), dynamic random access memory (DRAM), static random access memory (SRAM), read only memory (ROM), programmable read only memory (PROM), electrically programmable read only memory (EPROM), electrically erasable programmable read only memory (EEPROM), and flash memory.

The microprocessor 10 may be a superscalar microprocessor that implements an instruction-level parallelism within a single microprocessor. The superscalar microprocessor achieves high performance by executing multiple instructions per clock cycle. Multiple instructions are dispatched to different functional units for parallel execution. The superscalar microprocessor may employ out-of-order (OOO) execution, in which a second instruction without any dependency on a first instruction may be executed prior to the first instruction. In traditional out-of-order microprocessor design, the instructions can be executed out-of-order but they must retire to a register file of the microprocessor in-order because of control hazards such as branch misprediction, interrupt, and precise exception. Temporary storages such as re-order buffer and register renaming are used for the result data until the instruction is retired in-order from the execution pipeline. In this invention, the microprocessor 10 may execute and retire instruction out-of-order by write back result data out-of-order to the register file as long as the instruction has no data dependency and no control hazard. In the embodiments, no temporary register is used for this FSE microprocessor 10, since the microprocessor 10 is configured to issue an instruction having data dependency or control hazard by scheduling the instruction to a future time. However, the disclosure is not intended to limit thereto. In some other embodiments, temporary registers may also be used.

Referring to FIG. 1, the microprocessor 10 may include an instruction cache 11, a branch prediction unit (BPU) 12, a decode/issue unit 13, a register file 14, a scoreboard 15, a read/write control unit 16, a load/store unit 17, a data cache 18, a plurality of execution queues (EQs) 19A-19E, a plurality of functional units (FUNTs) 20A-20C. The microprocessor 10 also includes a read bus 31 and a result bus 32. The read bus 31 is coupled to the load/store unit 17, the functional units 20A-20C, and the register file 14 for transmitting operand data from registers in the register file 14 to the load/store unit 17 and the functional units 20A-20C, which may also be referred to as an operation of reading operation data (or store data in the case of store instruction) from the register file 14. The result bus 32 is coupled to the data cache 18, functional units 20A-20C, and the register file 14 for transmitting data from the data cache 18 or functional units 20A-20C to the registers of the register file 14, which may also be referred to as an operation of writeback result data (or load data in the case of load instruction) to the register file 14. Elements referred to herein with a particular reference number followed by a letter will be collectively referred to by the reference number alone. For example, execution queues 19A-19E may be collectively referred to as execution queues 19 unless specified. Some embodiments of the disclosure may use more, less, or different components than those illustrated in FIG. 1.

In some embodiments, the instruction cache 11 is coupled (not shown) to the memory 30 and the decode/issue unit 13, and is configured to store instructions that are fetched from the memory 30 and dispatch the instructions to the decode/issue unit 13. The instruction cache 11 includes many cache lines of contiguous instruction bytes from memory 30. The cache lines are organized as direct mapping, fully associative mapping or set-associative mapping, and the likes. The direct mapping, the fully associative mapping and the set-associative mapping are well-known in the relevant art, thus the detailed description about the above mappings are omitted.

The instruction cache 11 may include a tag array (not shown) and a data array (not shown) for respectively storing a portion of the address and the data of frequently-used instructions that are used by the microprocessor 10. Each tag in the tag array is corresponding to a cache line in the data array. When the microprocessor 10 needs to execute an instruction, the microprocessor 10 first checks for an existence of the instruction in the instruction cache 11 by comparing address of the instruction to tags stored in the tag array. If the instruction address matches with one of the tags in the tag array (i.e., a cache hit), then the corresponding cache line is fetched from the data array. If the instruction address does not match with any entry in the tag array (i.e., a cache miss), the microprocessor 10 may access the memory 30 to find the instruction. In some embodiments, the microprocessor 10 further includes an instruction queue (not shown) that is coupled to the instruction cache 11 and the decode/issue unit 13 for storing the instructions from the instruction cache 11 or memory 30 before sending the instructions to the decode/issue unit 13.

The BPU 12 is coupled to the instruction cache 11 and is configured to speculatively fetch instructions subsequent to branch instructions. The BPU 12 may provide prediction to branch direction (taken or not taken) of branch instructions based on the past behaviors of the branch instructions and provide the predicted branch target addresses of the taken branch instruction. The branch direction may be "taken", in which subsequent instructions are fetched from the branch target addresses of the taken branch instruction. The branch direction may be "not taken", in which subsequent instructions are fetched from memory locations consecutive to the branch instruction. In some embodiments, the BPU 12 implements a basic block branch prediction for predicting the end of a basic block from starting address of the basic block. The starting address of the basic block (e.g., address of the first instruction of the basic block) may be the target address of a previously taken branch instruction. The ending address of the basic block is the instruction address after the last instruction of the basic block which may be the starting address of another basic block. The basic block may include a number of instructions, and the basic block ends when a branch in the basic block is taken to jump to another basic block.

The functional units may include a branch execution unit (BEU) (e.g., functional units 20C coupled to the branch prediction unit 12 as illustrated in FIG. 1) that may execute the branch instruction and determine if the predicted branch direction is incorrect (misprediction). For example, the BEU may compare the predicted branch direction (taken or not taken) to actual branch executed to determine if the predicted branch direction is correct. The instructions subsequent to the mis-predicted branch are discarded from various units in the microprocessor. The branch misprediction may be also from the decode/issue unit 13 to decode unconditional branch instructions (always taken branches) which were not predicted by BPU 12. The decode unit 13 and the BEU 12 may provide update information to the BPU 12. In the microprocessor 10, the instructions after the branch instruction must not write back to the register file 14 until after the execution of the branch instruction.

The decode/issue unit 13 may decode the instructions received from the instruction cache 11. The instruction may include the following fields: an operation code (or opcode), operands (e.g., source operands and destination operands), and an immediate data. The opcode may specify which operation (e.g., ADD, SUBTRACT, SHIFT, STORE, LOAD, etc) to carry out. The operand may specify the index or address of a register in the register file 14, where the source operand indicates a register from the register file from which the operation would read, and the destination operand indicate a register in the register file to which a result data of the operation would write back. It should be noted that the source operand and destination operand may also be referred to as source register and destination register, which may be used interchangeably hereinafter. In the embodiment, the operand would need 5-bit index to identify a register in a register file that has 32 registers. Some instructions may use the immediate data as specified in the instruction instead of the register data. Each instruction would be executed in a functional unit 20 or the load/store unit 17. Based on the type of operation specified by the opcode and availability of the resources (e.g., register, functional unit, etc.), each instruction would have an execution latency time and a throughput time. The execution latency time (or latency time) refers to the amount of time (i.e., the number of clock cycles) for the execution of the operation specified by the instruction(s) to complete and writeback the result data. The throughput time refers to the amount of time (i.e., the number of clock cycles) when the next instruction can enter the functional unit 20.

In the embodiments, instructions are decoded in the decode/issue unit 13 to obtain the execution latency time, the throughput time, and instruction type based on the opcode. Multiple instructions may be issued to one execution queue 19 where the throughput time of multiple instructions are accumulated. The accumulated throughput time indicates when the next instruction can enter the functional unit 20 for execution in view of the previously issued instruction(s) in the execution queue 19. The time of when the instruction can be sent to the functional unit 20 is referred to as read time (from the register file), and the time of when the instruction is completed by the functional unit 20 is referred to as the write time (to the register file). The instructions are issued to the execution queues 19 where each issued instruction has the scheduled read time to dispatch to the functional units 20 or load/store unit 17 for execution. The accumulated throughput time is the read time of the issuing instruction. The instruction latency time of the instruction is added to the accumulated throughput to generate the write time when the instruction is issued to the next available entry of the execution queue 19. The modified execution latency time would be referred to herein as a write time of the most recent issued instruction, and the modified start time would be referred to herein as a read time of an issued instruction. The write time and read time may also be referred to as an access time which describes a particular time point for the issued instruction to write to or read from a register of the register file 14. Since the source register(s) is scheduled to read from the register file 14 just in time for execution by the functional unit 20, no temporary register is needed in the execution queue for source register(s) which is an advantage in comparison to other microprocessor in some embodiments. Since the destination register is scheduled to write back to the register file 14 from the functional unit 20 or data cache 24 at the exact time in the future, no temporary register is needed to store the result data if there are conflicts with other functional units 20 or data cache 24 which is an advantage in comparison to other microprocessor in some embodiments. For parallel issuing of more than one instruction, the write time and the read time of a second instruction may be further adjusted based on a first instruction which was issued prior to the second instruction. In some embodiments, the decode/issue unit 13 may decode a load/store instruction as two micro operations (micro-ops) including a tag micro-op and a data micro-op.

In the embodiments, the decode/issue unit 13 is configured to check and resolve all possible conflicts before issuing the instruction. An instruction may have the following 4 basic types of conflicts: (1) data dependency which includes write-after-read (WAR), read-after-write (RAW), and write-after-write (WAW) dependencies, (2) availability of read port to read data from the register file to the functional unit, (3) availability of the write port to write back data from the functional unit to the register file, and (4) the availability of the functional unit 160 to execute data. The decode/issue unit 13 may access the scoreboard 15 to check data dependency before the instruction can be issued to the execution queue 19. Furthermore, the register file 14 has limited number of read and write ports, and the issued instructions must arbitrate or reserve the read and write ports to access the register file 14 in future times. The decode/issue unit 13 may access the read/write control unit 16 to check the availability of the read ports and write ports of the register file 14, as to schedule the access time (i.e., read and write times) of the instruction. In other embodiments, one of the write ports may be dedicated for instruction with unknown execution latency time to write back to the register file 14 without using the write port control, and one of the read ports may be reserved for instructions with unknown read time to read data from the register file 14 without using the read port control. The number of read ports of the register file 14 can be dynamically reserved (not dedicated) for the unknown read operations. In this case, the functional unit 20 or the load/store unit 17 must ensure that the read port is not busy when trying to read data from the register file 14. In the embodiments, the availability of the functional unit 20 may be resolved by coordinating with the execution queue 19 where the throughput times of queued instructions (i.e., previously issued to the execution queue) are accumulated. Based on the accumulated throughput time in the execution queue, the instruction may be dispatched to the execution queue 19, where the instruction may be scheduled to be issued to the functional unit 20 at a specific time in the future at which the functional unit 20 is available.

Figure 2:
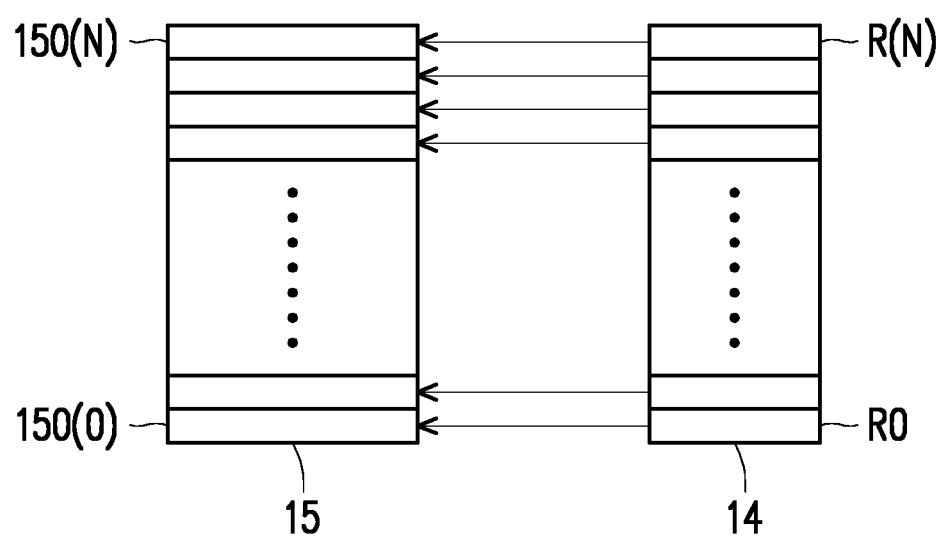
FIG. 2 a diagram illustrating a scoreboard and a register file in accordance with some embodiments of the disclosure.

FIG. 2 is a block diagram illustrating a register 14 and a scoreboard 15 in accordance with some embodiments of the disclosure. The register file 14 may include a plurality of registers R(0)-R(N), read ports and write ports (not shown), where N is an integer greater than 1. In the embodiments, the register file 14 may include a scalar register file and a vector register file. The disclosure is not intended to limit the number of registers, read ports and write ports in the register file 14. The scoreboard 15 includes a plurality of entries 150(0)-150(N), and each scoreboard entry corresponds to one register in the register file 14 and records information related to the corresponding register. In the embodiment, the scoreboard 15 has the same number of entries as the register file 14 (i.e., N number of entries), but the disclosure is not intended to limit the number of the entries in the scoreboard 15.

Figure 3A:
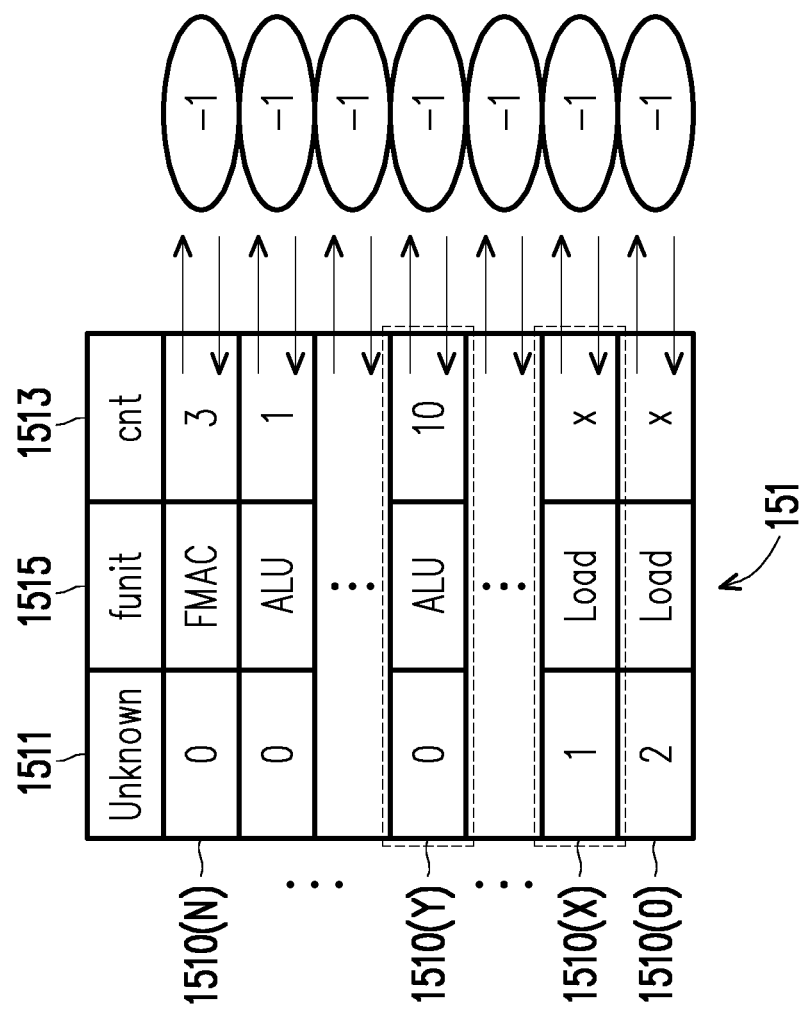
FIGS. 3A-3B are diagrams illustrating various structures of a scoreboard entry in accordance with some embodiments of the disclosure.
Figure 3B:
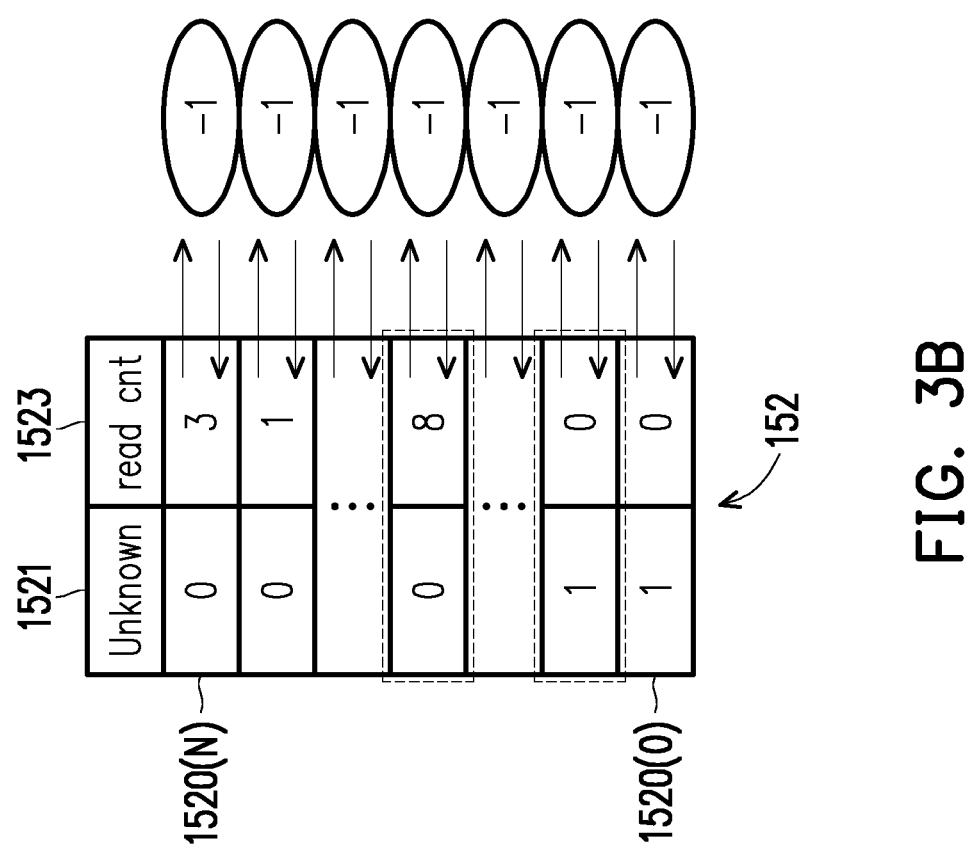

FIGS. 3A-3B are diagrams illustrating various structures of a scoreboard entry in accordance with some embodiments of the disclosure. In the embodiments, the scoreboard 15 may include a first scoreboard 151 for handling writeback operation to the register file 14 and a second scoreboard 152 for handling read operation from the register file 14. The first and second scoreboards 151, 152 may or may not coexist in the microprocessor 10. The disclosure is not intended to limited thereto. In other embodiments, the first and second scoreboards 151, 152 may be implemented or view as one scoreboard 15 that handles both read and write operations. FIG. 3A illustrates a first scoreboard 151 for the destination register of the issued instruction. FIG. 3B illustrates a second scoreboard 15 for the source registers of the issued instruction. With reference to FIG. 3A, each entry 1510(0)-1510(N) of the first scoreboard 151 includes an unknown field ("Unknown") 1511, a count field ("CNT") 1513 and a functional unit field ("FUNIT") 1515. Each of these fields records information related to the corresponding destination register that is to be written by issued instruction(s). These fields of the scoreboard entry may be set at a time of issuing an instruction.

The unknown field 1511 includes a bit value that indicates whether the write time of a register corresponding to the scoreboard entry is known or unknown. For example, the unknown load field 1511 may include one bit, where a non-zero value indicates that the register has unknown write time, and a zero value indicates that the register has known write time as indicated by the write count field 1513. In some embodiments, the unknown field 1511 may include any number of bits to indicate that one or more issued instruction(s) with unknown write time is scheduled to write the register. The unknown field 1511 may be set or modified at the issue time of an instruction and reset after the unknown register write time is resolved. The reset operation may be performed by either the decode/issue unit 13, a load/store unit 17 (e.g., after a data hit), or a functional unit 20 (e.g., after INT DIV operation resolve the number of digits to divide), and other units in the microprocessor that involves execution of instruction with unknown write time. In some embodiments, the unknown field 1511 may include two bits, which would have 4 different states that records the existence of three other issued instructions with unknown write time being scheduled to write the register. In yet some other embodiments, the unknown field 1511 may include three bits, four bits, and so on to record a plurality of issued instructions with unknown write time.

The write count field 1513 records a count value that indicates the number of clock cycles before the register can be written by the next instruction (that is to be issued), which may also be referred to as write count field recording write count value. In other words, the write count field 1513 records the number of clock cycles for which the previously issued instruction(s) would complete the operation and writeback the result data to the register. The write count value of the write count field 1513 is set based on the write time at the issue time of the instruction. Then, the count value counts down (i.e., decrement by one) for every clock cycle until the count value become zero (i.e., a self-reset counter). For example, the write time of an ADD instruction is 2 clock cycles, and the count value in the write count field

1513 would be set to 2 at the issue time of the ADD instruction for the destination register and self-reset when the counter field reaches 0. The count value of 3 indicates that the result data would be written back to the register corresponding to the scoreboard entry in 3 clock cycles later, a count value of 1 indicates that the result data would be written back to the register in this clock cycle, and a count value of 0 indicates that there is no data dependency for accessing the register.

The functional unit field 1515 of the scoreboard entry specifies a functional unit 20 (designated by the issued instruction) that is to write back to the register. For example, the functional unit field 1515 that records ALU indicates that the result data will be written back from an ALU function unit to the register. In some embodiments, the recorded functional unit in the functional unit field 1515 may be used to forward the result data from the recorded functional unit to the source operand(s) of the next instruction(s) when the write count field 1513 reaches a value of 1.

FIG. 3B is a diagram illustrating a structure of a scoreboard entry in accordance with some embodiments of the disclosure. The second scoreboard 152 having the structure of scoreboard entry 1520(0)-1520(N) is designed to resolve a conflict of an issued instruction writing to a register corresponding to a scoreboard entry indicating a previous instruction reading of the register which is WAR data dependency. The second scoreboard may also be referred to as a WAR scoreboard for resolving WAR data dependency. Each of the scoreboard entry 1520(0)-1520(N) includes an unknown field 1521 and a read count field (may also be referred to as the count field) 1523. The functional unit field may be omitted in the implementation of the WAR scoreboard. The unknown field 1521 includes a bit value that indicates whether the read time of a register corresponding to the scoreboard entry is known or unknown. The operation and the functionality of the unknown field 1521 is similar to the unknown field 1511, and therefore, the detail of which is omitted for the purpose of brevity. The read count field 1523 records a read count value that indicates the number of clock cycles for which the previously issued instruction(s) would take to read from the corresponding register. The read count field 1523 may also be referred to as the read count field that stores the read count value. Similar to the write count value of the (write) count field 1513, the read count value counts down by one for every clock cycle until the read count value reaches 0. The operation and functionality of the (read) count field 1523 is similar to the (write) count field 1513 unless specified, and thus the detail of which is omitted.

The read/write control unit 16 is configured to record the availability of the read ports and/or the write ports of the register file 14 at a plurality of clock cycles in the future for scheduling the access of instruction(s) that is to be issued. At time of issuing an instruction, the decode/issue unit 13 access the read/write control unit 16 to check availability of the read ports and/or the write ports of the register file 14 based on the access time specified by the instruction. In detail, the read/write control unit 16 selects available read port(s) in a future time as a scheduled read time to read source operands to the functional units 20, and selects available write port(s) in a future time as a scheduled write time to write back result data from the functional units 20. In the embodiments, the read/write control unit 16 may include a read shifter 161 and a write shifter 163 for scheduling the read port and the write port as described above.

Figure 5:
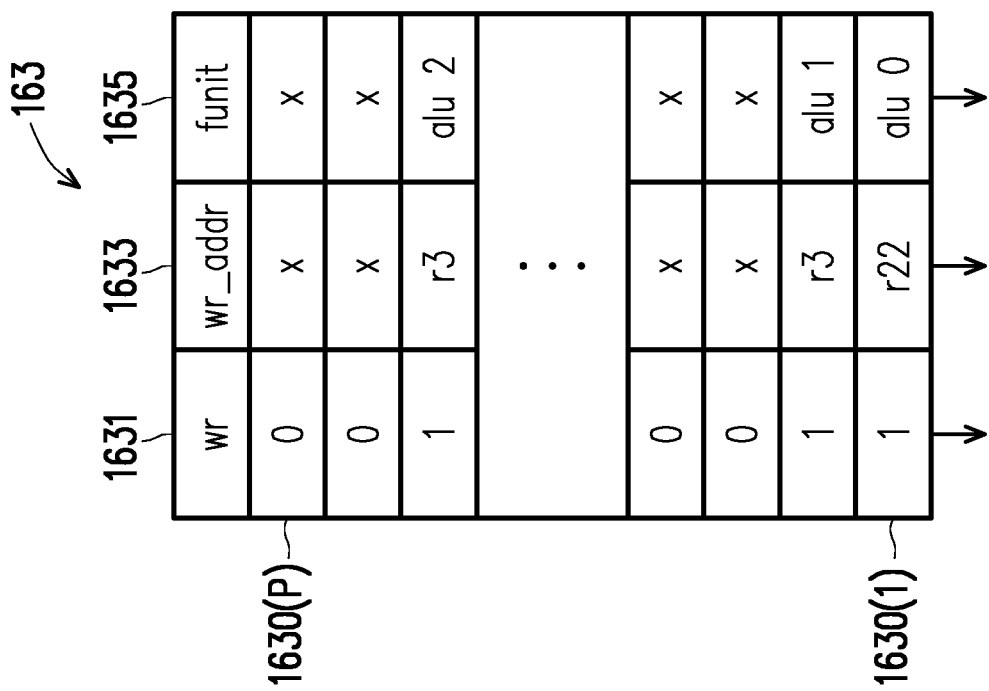
FIG. 5 is a diagram illustrating a write shifter associated with a write port of the register file in accordance with some embodiments of the disclosure.
Figure 4:
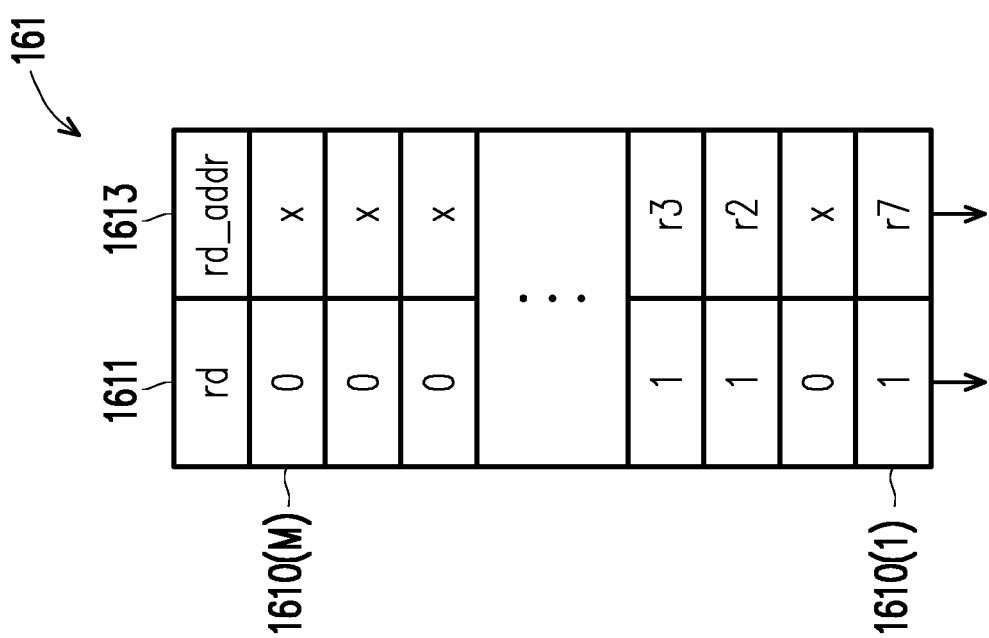
FIG. 4 is a diagram illustrating a read shifter associated with a read port of the register file in accordance with some embodiments of the disclosure.

FIG. 4 is a diagram illustrating a read shifter 161 associated with a read port of the register file in accordance with some embodiments of the disclosure. FIG. 5 is a diagram illustrating a write shifter 163 associated with a write port of the register file in accordance with some embodiments of the disclosure. Each of the read ports of the register file 14 may be associated with one read shifter 161, and each of the write ports of the register file 14 may be associated with one write shifter 163. In the embodiments, a plurality of read shifters 161 and a plurality of write shifters 163 may be included in the read/write control unit 16. However, the disclosure is not limited thereto. In some other embodiments, the read port(s) and the write port(s) are not part of the read/write control unit 16. The dedicated read and write port(s) are used for dynamic reading and writing to the register file 14 by the unknown read and write times of the instructions.

With reference to FIG. 4, the read shifter 161 includes a plurality of entries 1610(1)-1610(M), in which each entry may include a read valid field 1611 and an address field 1613, where M is an integer greater than 1. Each of the entries 1610(1)-1610(M) is associated with one clock cycle in the future and records the availability of the corresponding read port in that clock cycle. For example, the entry 1610(1) indicates the availability of the read port in the first upcoming clock cycle (i.e., immediate next clock cycle), and the entry 1610(M) indicates the availability of the read port in the Mth clock cycle in the future. With reference to FIG. 4, the bottommost entry of the entries 1610(1)-1610(M) would be shifted out for every clock cycle and a new entry is allocated for time M. For example, the bottommost entry 1610(1) would be shifted out in the immediate next clock cycle. In the embodiments, the read valid field 1611 records a read valid value ("rd") that indicates the availability of a read port in the corresponding clock cycle. For example, a non-zero value in the read valid field 1611(X) in a Xth entry indicates that the read port would be busy at the Xth clock cycle in the future, where X is greater than 1 and less than M. A zero value in the read valid field 1611(X) in the Xth entry indicates that the corresponding read port would be free for access at the Xth clock cycle in the future. The address field 1613 records an address ("rd_addr") of a register from which data is to be read from the register file 14. For example, the entry 1610(1) indicates that the corresponding read port would be busy at the immediate next clock cycle for reading data from register 7 (i.e., address "r7"). In some alternative embodiments, there are more or fewer fields in each entry of the read shifter 161 for recording other information.

At the issue time of an instruction, the decode/issue unit 13 checks the read/write control unit 16 for the availability of the read port(s) of the register file 14 at the read time of the instruction. For example, the read time is X clock cycles. The read/write control unit 16 checks the Xth entry of the read shifter(s) 161 to determine whether a read port is free at the Xth clock cycle in the future. If the number of available read ports is greater than or equal to the number of needed read ports of the instruction at the read time, then the decode/issue unit 13 may issue and schedule the instruction for execution at the (X+1)th clock cycle. The decode/issue unit 13 sends the reserved read port for each source register of the issued instruction to the execution queue 19 so that the execution queue 19 knows the exact read port(s) to extract source operand data to the functional unit 20. The read valid field 1611 and the read address 1613 of the read port are set for each valid source register of the issued instruction. If the number of the of available read ports is less than the number of needed read ports, then the decode/issue unit 13 may stall the instruction and re-check the read shifter(s) in next clock cycle. At the scheduled read time, the read shifter(s) provides the read valid rd and the register address rd_addr to the register file 14 to read the source register(s).

With reference to FIG. 5, the write shifter 163 (may be referred to as a latency shifter) includes a plurality of entries 1630(1)-1630(P), in which each entry includes a writeback valid field ("wr") 1631, a write address field ("wr_addr") 1633 and a functional unit field ("funit") 1635, where P is an integer greater than 1. Each of the entries 1630(1)-1630(P) is associated with one clock cycle in the future and records availability of the corresponding write port in that clock cycle. For example, the entry 1630(1) indicates the availability of the write port in the first upcoming clock cycle (i.e., immediate next clock cycle), and the entry 1630(P) indicates a status of the write port in the Pth clock cycle in the future. With reference to FIG. 5, the bottommost entry of the entries 1630(1)-1630(P) would be shifted out for every clock cycle. For example, the bottommost entry 1630(1) would be shifted out in the immediate next clock cycle and a new entry is allocated for time M. In the embodiments, the writeback valid field 1631 records a writeback valid value ("wr") that indicates the availability of the write port at a clock cycle corresponding to the entry. For example, a non-zero value in the writeback valid field 1631(Y) in a Yth entry indicates that the write port would be busy at the Yth clock cycle in the future, where Y is greater than 1 and less than P. A zero value in the read value field 1631(Y) in the Yth entry indicates that the write port would be free for access at the Yth clock cycle in the future. The write address field 1633 indicates an address ("wr_addr") of a register in the register file 14 to which a functional unit writes back the result data. The functional unit field 1635 specifies the functional unit 20 or load/store unit 17 ("funit") that would write back the result data to the write port. For example, the first entry 1630(1) of the write shifter 163 indicates that the write port would be busy in the first upcoming clock cycle, where ALU 0 recorded in the functional field 1635 would write back result data to the register 22 ("r22") recorded in the write address field 1633.

At the issue time of an instruction, the decode/issue unit 13 checks the read/write control unit for the availability of the write port(s) of the register file 14 at the write time of the instruction before issuing the instruction. For example, the write time is Y clock cycles. The read/write control unit 16 checks the Yth entry of the write shifter(s) 161 to determine whether the write port(s) is free at the Yth clock cycle in the future. If the number of available write ports is greater than or equal to the number of needed write ports of the instruction at the write time Y, then the decode/issue unit 13 may issue and schedule the instruction for execution completion at the Yth clock cycle (i.e., the scheduled write time). The writeback valid field 1631, the functional unit 1635 and the destination address 1633 are set for each valid destination register of the issued instruction. If the number of the of available write ports is less than the number of needed write ports, then the decode/issue unit 13 may stall the instruction and re-check the write shifter(s) in next clock cycle. At the scheduled write time, the read/write port control grabs the result data from the functional unit 20 as recorded in the functional unit field 1635 and write the result data to the register as specified in the write address field 1633.

With reference to FIG. 1, the execution queues 19 are configured to hold issued instructions which are scheduled to be dispatched to the functional units 20. The functional unit 20 may include, but not limited to, integer multiply, integer divide, an arithmetic logic unit (ALU), a floating-point unit (FPU), a branch execution unit (BEU), a unit that receive decoded instructions and perform operations, or the like. In the embodiments, each of the execution queues 19 are coupled to or dedicated to one of the functional units 20. In other embodiments, the execution queue 19 may be coupled to multiple functional units 20. For example, the execution queue 19A is coupled between the decode/issue unit 13 and the corresponding functional unit 20A to queue and dispatch the instruction(s) that specifies an operation for which the corresponding functional unit 20A is designed. Similarly, the execution queue 19B is coupled between the decode/issue unit 13 and the corresponding functional unit 20B, and the execution queue 19C is coupled between the decode/issue unit 13 and the corresponding functional unit 20C. In the embodiments, the execution queues 19D, 19E are coupled between the decode/issue unit 13 and the load/issue unit 17 to handle the load/store instructions, which would be illustrated in detail later. The execution queues 19D, 19E may also be referred to as a Tag-Execution Queue (TEQ) 19D and Data-Execution Queue (DEQ) 19E, respectively, which would be described in detail later.

Figure 6:
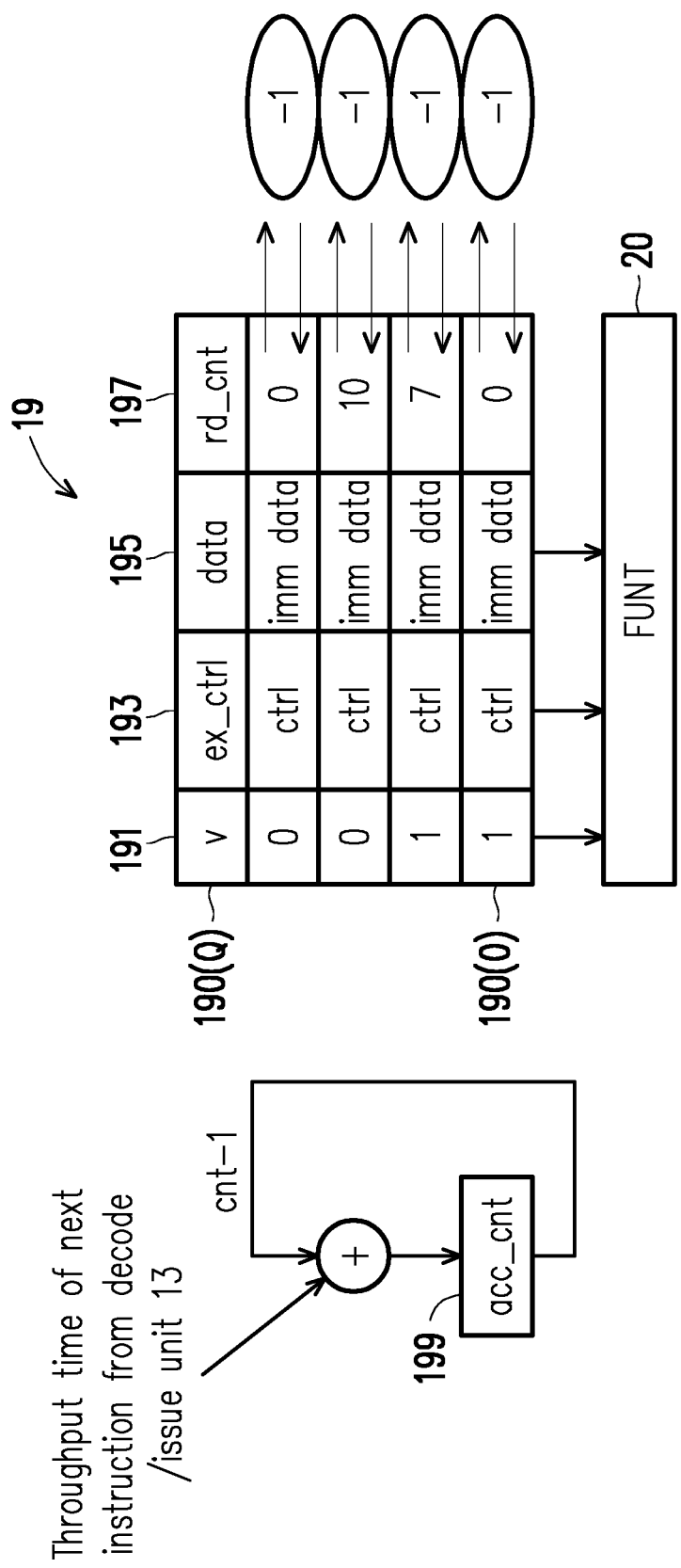
FIG. 6 is a diagram illustrating an execution queue in accordance with some embodiments of the disclosure.

FIG. 6 is a diagram illustrating an execution queue 19 in accordance with some embodiments of the disclosure. The execution queue 19 may include a plurality of entries 190(0)-190(Q) for recording information about instructions issued from the decode/issue unit 13 in an order that is to be sent to the functional unit 20, where Q is an integer greater than 0. In an example, each entry of the execution queue 19 includes a valid field 191, an execution control data field 193, a data field 195 and a read count field 197 which are labeled in FIG. 6 as "v", "ex ctrl", a "data", and a "rd_cnt", respectively. In other embodiments, there may be more or fewer fields which are recorded in each execution queue and the data field 195 may have other data instead of in addition to immediate data.

The valid field 191 indicates whether an entry is valid or not (e.g., valid entry is indicated by "1" and invalid entry is indicated by "0"). The execution control data field 193 and the data field 195 indicate an execution control information for the functional unit 20 and immediate data of the instruction, which are derived from the instruction. The read count field 197 records a read count value rd_cnt for indicating a read time of the instruction. The read time stored in the read count field 197 is counted down by one for every clock cycle until the read count rd_cnt reaches zero. When the read time in the read count field 197 is 0, the execution queue 19 dispatches the valid instruction to the functional unit 20.

The execution queue 19 may include or couple to an accumulate counter 199 for storing an accumulate count value acc_cnt that is counted down by one for every clock cycle until the counter value becomes zero. The accumulative count of zero indicates that the execution queue 19 is empty. The accumulate count value acc_cnt of accumulate counter 199 indicates a time (i.e., the number of clock cycles) in the future at which the next instruction can be dispatched to the functional units 20 or the load/store unit 17. The next instruction in decode/issue unit 13 can be issued to the execution queue 19 with a scheduled dispatched time to the functional unit 20 or the load/store unit 17 according to the accumulate count value of the accumulate counter 199. In some embodiments, the read time of the instruction is the accumulate count value, and the accumulate count value is set according to the sum of current acc_cnt and the instruction throughput time (acc_cnt=acc_cnt+inst_xput_time) for the next instruction. In some other embodiments, the read time may be modified (in which read time is greater than the current accumulate count), and the accumulate count value acc_cnt is set according to a sum of a read time (rd_cnt) of the instruction and a throughput time of the instruction (acc_cnt=rd_cnt+inst_xput_time) for the next instruction. In some embodiments, the read shifters 161 and the write shifters 163 are designed to be synchronized with the execution queue 19. For example, the execution queue 19 may dispatch the instruction to the functional unit 20 or load/store unit 17 at the same time as the source registers are read from the register file 14 according to the read shifters 161, and the result data from the functional unit 20 or the load/store unit 17 are written back to the register file 14 according to the write shifters 163.

With reference to FIG. 1, the load/store unit 17 is coupled to the decode/issue unit 13 to handle load instruction and store instruction. In the embodiments, the decode/issue unit 13 issues the load/store instruction as two micro operations (micro-ops) including a tag micro-op and a data micro-op. The tag micro-op is sent to the TEQ 19D and the data micro-op is sent to DEQ 19E. In some embodiment, the throughput time for micro-ops of the load/store instruction is 1 cycle. The TEQ 19D and DEQ 19E are independent operations, and the TEQ 19D issues the tag micro-op for a tag operation before the DEQ 19E issues the data micro-op for a data operation.

The data cache 18 is coupled to the register file 14, the memory 30 and the load/store unit 17 and configured to temporary store data that are fetched from the memory 30. The load/store unit 17 accesses the data cache 18 for load data or store data. The data cache 18 includes many cache lines of contiguous data bytes from memory 30. The cache lines of data cache 18 are organized as direct mapping, fully associative mapping or set-associative mapping similar to the instruction cache 11 but not necessary the same mapping as with the instruction cache 11.

The data cache 18 may include a tag array (TA) 22 and a data array (DA) 24 for respectively storing a portion of the address and the data frequently-used by the microprocessor 10. Each tag in the tag array 22 is corresponding to a cache line in the data array 24. When the microprocessor 10 needs to execute the load/store instruction, the microprocessor 10 first checks for an existence of the load/store data in the data cache 18 by comparing the load/store address to tags stored in the tag array 22. If the load/store address matches with one of the tag in the tag array (cache hit), then the corresponding cache line in the data array 24 is accessed for load/store data. The load instruction fetches the data from a cache line of the data array 24 to write to a destination register of the register file 14, while the store instruction writes the data from a source register of the register file 14 to a cache line in the data array 24. If the load/store address does not match with any entry in the tag array 22 (cache miss), the microprocessor 10 may access the memory 30 to find the data. In case of cache hit, the execution latency of the load/store instruction is known (e.g, 2, 3, 4, or any number of clock cycles). In case of cache miss, the execution latency of the load/store instruction is 6 clock cycles or more. The execution latency for load instruction is basically unknown depended on cache hit and the latency of the memory 30.

The tag operation includes calculation of the address by the address generation unit (AGU) 171 in the load/store unit 17 and using the calculated address to access the tag array 22 and the data translation look-aside buffer (TLB) (not shown) for virtual to physical address translation. The address calculation is the addition operation of a source register from the register file 14 and immediate data ("imm data") from the data field 195 of FIG. 6. The read shifter 161 of FIG. 4 is scheduled to read the source register from the register file 14 to match with dispatching of the tag operation from TEQ 19D to AGU 171. In some embodiment, the virtual address and physical address are the same in which case the data TLB is not needed. The TEQ 19A dispatches the tag operation to an address generation unit (AGU) 171 of the load/store unit 17 to calculate a load/store address. The load/store address is used to access a tag array (TA) 22 of the data cache 18. The cache hit/miss and the hit way (set associative mapping) are kept in order to be accessed by the DEQ 19B where the data operation accesses a cache line of the hit way in the DA 24. If the DA 24 is accessed in concurrent with the TA 22, then all ways of the set-associative mapping in the DA 24 are read. In the embodiment, the serial access of the DA 24 after the TA 22 allows a single way of DA 24 to be read, thus DA 24 can save significant power and reduce data bank conflict.

For a load instruction, in the case of cache hit, the data is fetched from the DA 24 and written back to the destination register of the register file 14 through write control of the write shifter 163. In the case of cache miss, the status of the destination register in the scoreboard 15 is changed to unknown, and the load data is fetched from memory 30. Then, the load data from memory 30 are written back to the destination register of the register file 14 through the dedicated write port. In implementation, the load data from the memory 30 are written to a data miss buffer (not shown), then the data miss buffer will write back to the destination register of the register file 14 and eventually write the cache line data to the data cache 24.

For a store instruction, in the case of the cache hit, the store data are scheduled to be read from the register file 14 by the read shifters 21 just in-time to write to DA 24. In the case of cache miss, the store data may be sent to a store miss buffer (not shown) in the load/store unit 17. In the conventional execution of the store instruction, the source register for the tag address and the source register for the store data can be read at the same time from the register file 14 in which case the store buffer is needed to keep the store data until time that it is written to DA 24. In this invention, the time to write store data to DA 24 (assuming cache hit) is known, therefore, the read port control is scheduled to read the source register for store data "just-in-time" from the register file 14 to write to DA 24, thus the store buffer is not needed. For cache miss, the source register for store data is not read from the register file 14 until the store data are ready to write to the data cache which is "just-in-time" reading of the source register.

For cache miss, the load/store unit 17 may allow many pending cache miss requests to memory 30. The multiple pending miss requests are kept in a miss request queue (not shown) in the load/store unit 17. The new cache line is fetched from memory 30 into a miss data buffer (not shown) in the data cache 18. The miss data buffer may consist of multiple cache lines. In addition, the replacement cache line in the data cache 18 may be dirty where the dirty cache line must be written back to the memory 30 before new cache line from memory 30 can be written into the data cache 18. The dirty cache line is fetched from the data cache 18 into an eviction buffer before evicting to memory 30. The eviction buffer may be implemented as part of the miss data buffer. The eviction buffer, the miss request queue, and the miss data buffer must be checked by subsequent load/store instructions for matching and forwarding of data.

The load/store instructions may have precise exception in which all subsequent instructions must be discarded from the execution pipeline. Similar to branch instruction, all subsequent instructions after the load/store instruction cannot write back to the register file 14 until the execution of the load/store instruction. The load/store instruction with cache miss may have the data error exception which is imprecise exception and is taken by stopping the decode/issue unit 13 from issuing any more instruction and after completion of all instructions in the execution pipeline. Interrupt is similar to the imprecise exception where interrupt is taken by stopping the decode/issue unit 13 from issuing any more instructions and after completion of all instructions in the execution pipeline.

In the following, a process of issuing an instruction with known access time by using the scoreboard 15, accumulated throughput time of the instructions in the execution queue 19 and the read/write control unit 16 would be explained.

When the decode/issue unit 13 receives an instruction from the instruction cache 11, the decode/issue unit 13 accesses the scoreboard 15 to check for any data dependencies before issuing the instruction. Specifically, the unknown field and count field of the scoreboard entry corresponding to the register would be checked for determining whether the previously issued instruction has a known access time. In some embodiments, the current accumulated count value of the accumulate counter 199 may also be accessed for checking the availability of the functional unit 20. If a previously issued instruction (i.e., a first instruction) and the received instruction (i.e., a second instruction) which is to be issued are to access the same register, the second instruction may have a data dependency. The second instruction is received and to be issued after the first instruction. Generally, data dependency can be classified into a write-after-write (WAW) dependency, a read-after-write (RAW) dependency and a write-after-read (WAR) dependency. The WAW dependency refers to a situation where the second instruction must wait for the first instruction to write back the result data to a register before the second instruction can write to the same register. The RAW dependency refers to a situation where the second instruction must wait for the first instruction to write back to a register before the second instruction can read data from the same register. In the RAW case, the writeback data can be forward from the functional unit to the second instruction. The WAR dependency refers to a situation where the second instruction must wait for the first instruction to read data from a register before the second instruction can write to the same register. With scoreboard 15 and execution queue 19 described above, instructions with known access time may be issued and scheduled to a future time to avoid these data dependencies.

In an embodiment of handling RAW data dependency, if the write count value of the write count field 1513 is equal or less than the read time of the instruction to be issued (i.e., inst_read_time), then there is no RAW dependency, and the decode/issue unit may issue the instruction. If the count value of the write count field 1513 is greater than a sum of the instruction read time and 1 (e.g., inst_read_time+1), there is RAW data dependency, and the decode/issue unit 13 may stall the issue of the instruction. If the write count value of the write count field 1513 is equal to sum of the instruction read time and 1 (e.g., inst_read_time+1), the result data may be forwarded from the functional unit recorded in the functional unit field 1515. In such case, the instruction with RAW data dependency can still be issued. The functional unit field 1515 may be used for forwarding of result data from the recorded functional unit to a functional unit of the instruction to be issued. In an embodiment of handling a WAW data dependency, if the write count value of the write count field 1513 is greater than or equal to the write time of the instruction to be issued, then there is WAW data dependency and the decode/issue unit 13 may stall the issuing of the instruction. In an embodiment of handling a WAR data dependency, if the read count value of read count field 1523 is greater than the write time of the instruction (i.e., current instruction to be issued), then there is WAR data dependency, and the decode/issue unit 13 may stall the issue of the instruction. If the read count value of the read count field 1523 is less than or equal to the write time of the instruction, then there is no WAR data dependency, and the decode/issue unit 13 may issue the instruction. Note that the issued instruction is kept in the execution queue 19 and scheduled to be dispatched to the functional unit 20 at a read time scheduled in the future.

Based on the count value in the count field of the scoreboard 15, the decode/issue unit 13 may anticipate the availability of the registers and schedule the execution of instructions to the execution queue 19, where the execution queue 19 may dispatch the queued instruction(s) to the functional unit 20 in an order of which the queued instruction(s) is received from the decode/issue unit 13. The execution queue 19 may accumulate the throughput time of queued instructions in the execution queue 19 to anticipate the next free clock cycle at which the functional unit 20 is available for executing the next instruction. The decode/issue unit 13 may also synchronize the read ports and write ports of the register file by accessing the read/write control unit 16 to check the availability of the read ports and writes ports of the register file 14 before issuing the instruction. For example, the accumulated throughput time of the first instruction(s) in the execution queue 19 indicates that the functional unit 20 would be occupied by the first instruction(s) for 11 clock cycles. If the latency time of the second instruction is 12 clock cycles, then the result data will be written back from the functional unit 20 to the register file 14 at time 23 (or the $23^{rd}$ clock cycle from now) in the future. In other words, the decode/issue unit 13 would ensure the availability of the source register(s) and the read port(s) at $11^{th}$ clock cycle and availability of the write port(s) for writing of the destination register(s) at $23^{rd}$ clock cycle at the issue time of the second instruction. If the read port or write port is busy in the corresponding clock cycles, the decode/issue unit 13 may stall for one clock cycle and check the availabilities of the register and read/write ports again.

In the pipeline microprocessor, it is critical to minimize stalling of any instruction, especially load/store instructions, in decode/issue unit, which stops the instruction stream from moving forward. Instructions having known access time may be issued to a specific time in the future by using the scoreboard 15, the read/write control unit 16, and the execution queue 19 as described above. However, the instructions with unknown access time may be stalled in decode/issue unit 13 due to data dependency and unknown access time of the instruction for accessing the register. Load instruction is an example of instruction that has unknown execution latency time for write back to the destination register of the register file 14, and store instruction is an example of instruction that has unknown read time for reading a register in the register file 14. There are many factors that may cause the unknown access time, for example, but not limited to, cache hit/miss, TLB hit/miss, data bank conflicts, and external memory access time. For example, the execution latency time of the load instruction depends on the location of load data which may be stored in the data cache or external memory. If the data is stored in data cache, it may take 2 clock cycles to load. However, if the data is stored in a memory (e.g., RAM) coupled to the microprocessor, it may take 50-100 clock cycles to load. The instruction pipeline would be stalled in the decode/issue unit until a data hit. In the following, embodiments are described to illustrate how does the FSE microprocessor handle the load/store instructions with unknown access time. Instead of stalling the pipeline at instruction decode/issue stage, the FSE microprocessor schedules the load/store instructions to the execution queues 19D, 19E.

Figure 7:
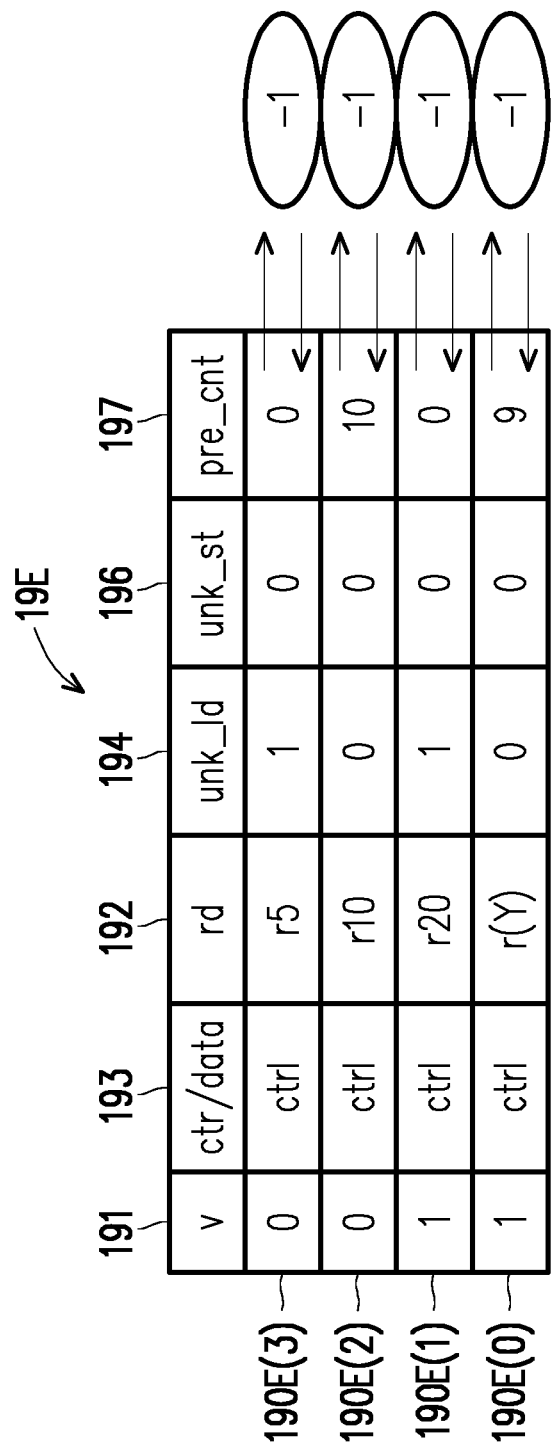
FIG. 7 is a diagram illustrating a data execution queue (DEQ) in accordance with some embodiments of the disclosure.

FIG. 7 is a diagram illustrating a data execution queue (DEQ) 19E in accordance with some embodiments of the disclosure. The DEQ 19E includes a plurality of DEQ entries 190E(0)-190E(3) that record various information of the queued load/store instructions in an order of which the load/store instruction is received. That is, the queued instruction in the first DEQ entry 190E(0) is received and scheduled for dispatching to the load/store unit 17 before the queued instruction in the second entry 190E(1). Each DEQ entry corresponds to one queued load/store instruction and includes a valid field 191 ("v"), an execution control data field 193 ("ctrl/data"), an address field 192 ("rd"), an unknown load field 194 ("unk_ld"), an unknown store field 196 ("unk_st"), and a pre-count field 197 ("pre_cnt"). The fields of the DEQ entries are set when the load/store instruction(s) is received from the decode/issue unit 13 (i.e., one clock cycle after the issue time of the instruction in the decode/issue unit). The DEQ entry may be reset (invalidated) when the corresponding load/store instruction is resolved and dispatched to load/store unit 17. The valid field 191 indicates whether an entry is valid or not (e.g., valid entry is indicated by "1" and invalid entry is indicated by "0"). The address field 192 indicates the register to which the load/store instruction is to access. The execution control data field 193 indicates an execution control information and immediate data for the load/store unit 17, which is derived from the instruction. The unknown load field 194 indicates a WAW or RAW data dependency with a previous load instruction (load instruction by definition has unknown write time). For example, the unknown load field 194 may be set in the case of WAW or RAW dependency. The WAW data dependency is if the current instruction is a load instruction and the RAW data dependency is if the current instruction is a store instruction. The unknown store field 196 indicates a WAR data dependency with a previous store instruction (store instruction by definition has unknown read time). The values of unknown load field 194 and unknown store field 196 are associated to the value of the unknown fields 1511 and 1521 of the scoreboard entry 1510 and 1520, which would be explained in detail later. If the current load/store instruction has WAW, WAR, or RAW data dependency with a previous instruction, then the count value 1513 and 1523 of the corresponding scoreboard entry of the previous instruction would be recorded in the pre-count field 197. The current load/store instruction may have multiple data dependencies in which case the worst count values (1513 or 1523) is recorded in the pre-count field 197 (e.g., the largest count value out of the corresponding scoreboard entries). The pre-count value would decrement by one for every clock cycle (e.g., "−1" blocks illustrated in FIG. 7) until it reaches 0 in which case the current load/store instruction is free of data dependency of the previous instructions with known access times. Note that the current load/store instruction may have multiple data dependencies with previous instructions with both known and unknown access times in which case the fields 194, 196, and 197 may all be set to non-zero values. The DEQ 19E would have to wait until the unknown load count in the unknown load field 194, the unknown store count in the unknown store field 196 and the pre-count value in the pre-count field 197 of a DEQ entry reach 0 before dispatching the load/store instruction corresponding to the DEQ entry to the load/store unit 17. Although FIG. 7 only shows 4 DEQ entries 190E(0)-190E(3), the disclosure is not intended to limit the number of the DEQ entries. More or less DEQ entries may to used based on the design requirement.

In a process of issuing a load/store instruction, the decode/issue unit 13 accesses the scoreboard 15 to check the status of the register to which the load/store instruction is to access before issuing the load/store instruction to the DEQ 19E. At issue time of the load/store instruction, the values of the corresponding scoreboard entry which represent the WAW, WAR, and RAW data dependencies are sent to the DEQ 19E with the load/store instruction. For example, the unknown load\store values in the unknown load\store fields 1511 and 1521 and count values in the write and read count fields 1513, 1523, may be sent to the DEQ 19E with the load/store instruction. The load/store instruction are issued by the decode/issue unit 13 as two micro operations (micro-ops) including a tag micro-op and a data micro-op. The tag micro-op is sent to the TEQ 19D and the data micro-op is sent to DEQ 19E.

As described above, the unknown load/store fields 1511 and 1521 of the scoreboard entry may include a plurality of bits that records a plurality of load\store instructions having unknown access time, which will write (load instruction) to the same destination register or read (store instruction) from the same source register. For example, 2-bits may record a maximum number of 3 instructions having unknown access time, where 0 ("00") means no instruction having unknown access time is issued to the execution queue 19, 1 ("01") means one instruction having unknown access time is queued in the execution queue 19, and 3 ("11") means that 3 instructions having unknown access time to the same register are queued in the execution queue 19. In the embodiments of 2-bits, three would be the maximum number of instructions having unknown access time the DEQ 19E may hold (or decode/issue unit 13 may issue to the execution queue), which may be referred to as a predetermined unknown value (or threshold). If there is a fourth instruction having unknown access time is received by the decode/issue unit 13 before any of the three queued instructions having unknown access time is resolved, the decode/issue unit 13 may stall the pipeline. The disclosure is not intended to limit the number of instructions having unknown access time the DEQ 19E may hold. In some other embodiments, the unknown field of the scoreboard entry may include 3 bits, 4 bits, or so on, where 3-bits may give the scoreboard entry the capability to record that there are 7 instructions having unknown time are issued and unresolved. Embodiments involving RAW, WAW, and WAR data dependencies while issuing the load/store instructions are used to illustrate the handling the load/store instruction. In the followings, a first instruction refers to instruction(s) that is already issued to and queued in the DEQ 19E, where information (i.e., unknown load\store values and known count value representing read time or write time) related to the first instruction are recorded in the scoreboard entry and the DEQ 19E. Second instruction refers to an instruction that is to be issued to the execution queue 19 by the decode/issue unit 13 after the first instruction. It should be noted that the unknown load count in the unknown load\store field 1511, 1521 of the corresponding scoreboard entry will be respectively checked to determine whether the unknown load count or the unknown store count is equal to or greater than the predetermined unknown value (e.g., 3 if 2 bits is used for this field) before issuing of the second instruction. If one of the unknown load\store values in the scoreboard entry is equal to or greater than the predetermined unknown value, the decode/issue unit 13 may stall the issuing of the second instruction. If no, the unknown load\store value of the scoreboard entry would be incremented by 1 when the second instruction with data dependency having unknown access time is issued.

Figure 8:
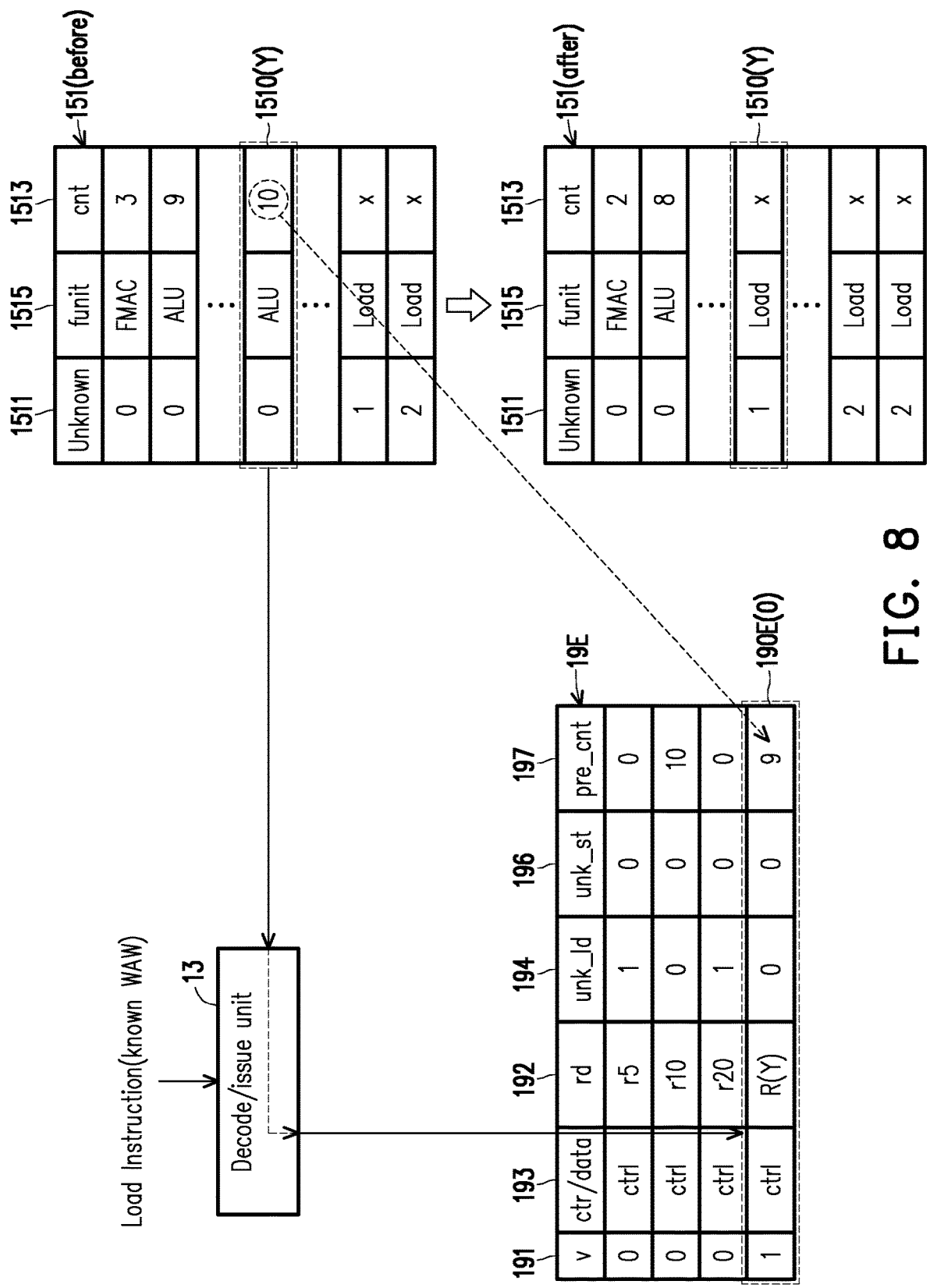
FIG. 8 is a diagram illustrating an operation of issuing a load instruction having a WAW data dependency with known access time in accordance with some embodiments.

FIG. 8 is a diagram illustrating an operation of issuing a load instruction having a WAW data dependency with known access time in accordance with some embodiments. In the embodiments, a load instruction (i.e., the second instruction) is received by the decode/issue unit 13, where the load instruction is to write the load data back to a register R(Y). Before issuing the load instruction, the decode/issue unit 13 accesses the scoreboard entry 1510(Y) to check for data dependency. The scoreboard entry 1510(Y) indicates that an ALU instruction (i.e., first instruction) will write to register R(Y) of the register file 14 in 10 clock cycles based on the information in the write count field 1513 and functional unit field 1515. Since the ALU instruction has a known access time, the load instruction having a WAW data dependency with the ALU instruction may be referred to as WAW data dependency having known access time. In the embodiments, the decode/issue unit 13 issues the load instruction with scoreboard values in the scoreboard entry 1510(Y) in the scoreboard 151 to next available DEQ entry (e.g., 190E(0)) of the DEQ 19E.

At the issue time of the load instruction, the decode/issue unit 13 would update the unknown field 1511 of the scoreboard entry 1510(Y) to indicate that the latest issued instruction is a load instruction having unknown access time to the register R(Y). FIG. 8 also shows the update of the scoreboard entry 1510(Y) before and after the issuing of the load instruction. In detail, after the issuing of load instruction, the unknown value of unknown field 1511 in the scoreboard entry 1510(Y) would be incremented by one ("1"), and the functional unit field is changed to "Load". In the embodiments, the write count value in the write count field 1513 in the scoreboard entry 1510(Y) may or may not be updated. Since the unknown field 1511 is set, the next instruction accessing the register corresponding to the scoreboard entry 1510(Y) would anticipate that the previously issued instruction is an instruction with unknown access time. It should be noted that the write count value of the write count field 1513 before issuing of load instruction (i.e., "10") would be sent to the DEQ 19E with the issuing of the second instruction. With reference to the DEQ 19E as illustrated in FIG. 8, the load instruction would be placed in the (next available) DEQ entry 190E(0), and the fields of the DEQ entry 190E(0) would be configured according to the load instruction and the scoreboard values sent with the load instruction. In detail, the valid field is change to "1" to validate the entry, the execution control data field 193 is changed to store the control data of the load instruction, the address field 192 is changed to "r(Y)" to indicate that the load instruction is to writeback to the register R(Y). The unknown field 1511 of the scoreboard entry 1510(Y) of the scoreboard 151 is copied to the unknown load field 194 of the DEQ entry 190E(0), and the unknown store field 196 of the DEQ entry 190E(0) would be a reproduction of the unknown field 1521 of the entry 1520(Y) of the second scoreboard 152 which is assumed to be 0 in the embodiments. Since the first instruction prior to the load instruction is an ALU instruction which has known access time, the count value of count field 1515 of the scoreboard 151 (before issuing) would be copied to the pre-count field 197 of the DEQ entry 190E(0). The pre-count value in the pre-count field 197 is set to 9 which is derived from the count value of 10 in the scoreboard entry 150(Y) before issuing. Since the DEQ entry 190E(0) is set one clock cycle after the write count value of 10 in the write count field 1513 is read, the count value of 10 is decremented by one (i.e., 9) when the load instruction is allocated to the DEQ entry 190E(0). In other words, the pre-count value in the DEQ entry 190E(0) records the number of clock cycles in the future for the ALU instruction to writeback the result data to the register R(Y). The DEQ entry 190E(0) counts down the pre-count value by one for every clock cycles until the pre-count value reaches 0 (indicating that the WAW data dependency is no longer valid), and then dispatches the load instruction in the DEQ entry 190E(0) to the load/store unit 17. In another embodiment, the pre-count value 197 may further decrement by the minimum latency time of the load instruction, i.e., if the minimum latency time of the load instruction is 3 cycles (instead of 1 cycle), then the pre-count value 197 is set to 7. Basically, the load instruction can only write back to the R(Y) at the earliest time of 11 cycles from the issue time. It should be noted that the TEQ 19D can access the tag array which cache hit/miss many cycles before the DEQ 19E can issue the load instruction from the DEQ entry 190E(0). For cache hit, the load data can be fetched from the DA 24 many cycles earlier but must wait for the pre-count value to reset before the load data can be written back to register R(Y) of the register file 14 through the dedicated write port. The cache miss in the TEQ 19D can start external memory access before the DEQ 19E would dispatch the load instruction to the load/store unit 17. It is possible for the load instruction to have both known WAW and WAR data dependencies in which case the pre_cnt field 197 is set to the larger value of the write count value 1513 and the read count value 1523 of the first and second scoreboards 151, 152.

Figure 9:
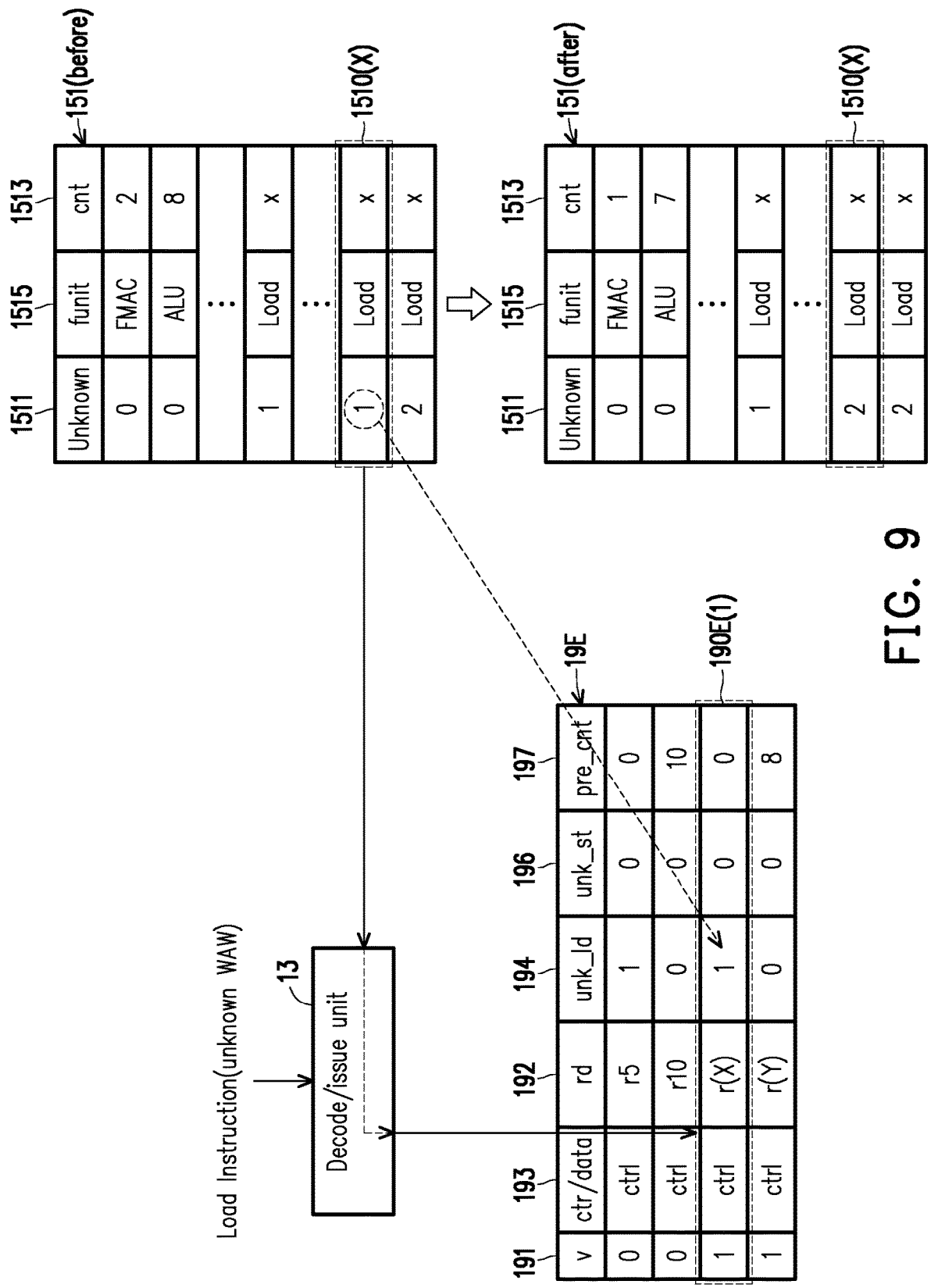
FIG. 9 is a diagram illustrating an operation of issuing a load instruction having a WAW data dependency with unknown access time in accordance with some embodiments.

FIG. 9 is a diagram illustrating an operation of issuing a load instruction having a WAW data dependency with unknown access time in accordance with some embodiments. In the embodiments, a load instruction (i.e., a second instruction or second load instruction) is received by the decode/issue unit 13, where the load instruction is to write back the load data to a register R(X). Before issuing the load instruction, the decode/issue unit 13 access the scoreboard entry 1510(X) to check for data dependency. The scoreboard entry 1510(X) indicates that there is a prior load instruction (i.e., first load instruction) writing to register R(X) of the register file 14 based on the unknown field 1511 ("1") of the scoreboard entry 1510(X). The second load instruction having a WAW data dependency with the first load instruction may be referred to as WAW data dependency having unknown access time. In the embodiments, the decode/issue unit 13 issues the second load instruction with scoreboard values in the scoreboard entry 1510(X) in the scoreboard 151 to next available DEQ entry (e.g., 190E(1)) of the DEQ 19E. It should be noted that the embodiments may also access the scoreboard entry 1520(X) of the second scoreboard 152 to check for the WAR data dependency of the register R(X). The embodiments assume that there is only WAW or WAR data dependency for the purpose of brevity. In other embodiments, the register R(X) may have a WAR data dependency in addition to the WAW data dependency described above. In such embodiments, the values (e.g., unknown value and read count value) of the scoreboard entry 1520(X) of the second scoreboard 152 may also be issued with the second load instruction.

At the issue time of the second load instruction, the decode/issue unit 13 would update the unknown field 1511 of the scoreboard entry 1510(X) to indicate that the latest issued instruction is another load instruction having unknown access time to the register R(X) as illustrated in FIG. 9. In detail, after the issuing of second load instruction, the unknown value of unknown field 1511 in the scoreboard entry 1510(X) would be incremented by one (i.e., becoming a value of "2"). Since the previously issued instruction for accessing the register R(X) is load instruction as well, the functional unit field 1515 of the scoreboard entry 1510(X) would be set for load instruction already. Therefore, the embodiments may or may not change the functional unit field 1515 of the scoreboard entry 1510(X) to "load", which the disclosure is not intended to limit. With reference to the DEQ 19E as illustrated in FIG. 9, the second load instruction would be placed in the (next available) DEQ entry 190E(1), and the fields of the DEQ entry 190E(1) would be configured according to the second load instruction and the scoreboard values that was sent with the second load instruction. In detail, the valid field is change to "1" to validate the entry, the execution control data field 193 is changed to store the control data of the second load instruction, the address field 192 is changed to "r(X)" to indicate that the second load instruction is to writeback to the register R(X). The unknown field 1511 (having a value of "1") of the scoreboard entry 1510(X) would be copied to the unknown load field 194 of the DEQ entry 190E(1) to indicate that there is a first load instruction with unknown write time prior to the second load instruction. Since the second load instruction also has unknown access time, the unknown value of unknown field 1511 of the scoreboard entry 1510(X) would be updated to "2" after the second load instruction is issued. The unknown store field 196 of the 190E(0) entry would be a copy of the unknown field 1521 of the entry 1520(X) of the scoreboard 152 which is assumed to be 0 in the embodiments. In detail, the value of the unknown load field 194 of the DEQ entry 190E(1) would be changed from "0" to "1", as to indicate that there is a prior load instruction before the second load instruction. In the embodiments, the pre-count field 197 would be 0 since the first load instruction has unknown access time. The execution queue 19E keeps the unknown load count and monitors the dedicated write port (one of the result buses 32) for writeback operation to the register R(X) to decrement the unknown load count in the DEQ 19E in the same manner as the scoreboard 151. In some embodiment, the load/store unit 17 may send the writeback signal along with register R(X) to the DEQ 19E and the scoreboard 151 to decrement the unknown load count. As noted before, the DEQ 19E would have to wait until the unknown load count in the unknown load field 194, the unknown store count in the unknown store field 196 and the pre-count value in the pre-count field 197 of the DEQ entry 190E reach 0 before dispatching the load/store instruction corresponding to the DEQ entry to the load/store unit 17.

Figure 10A:
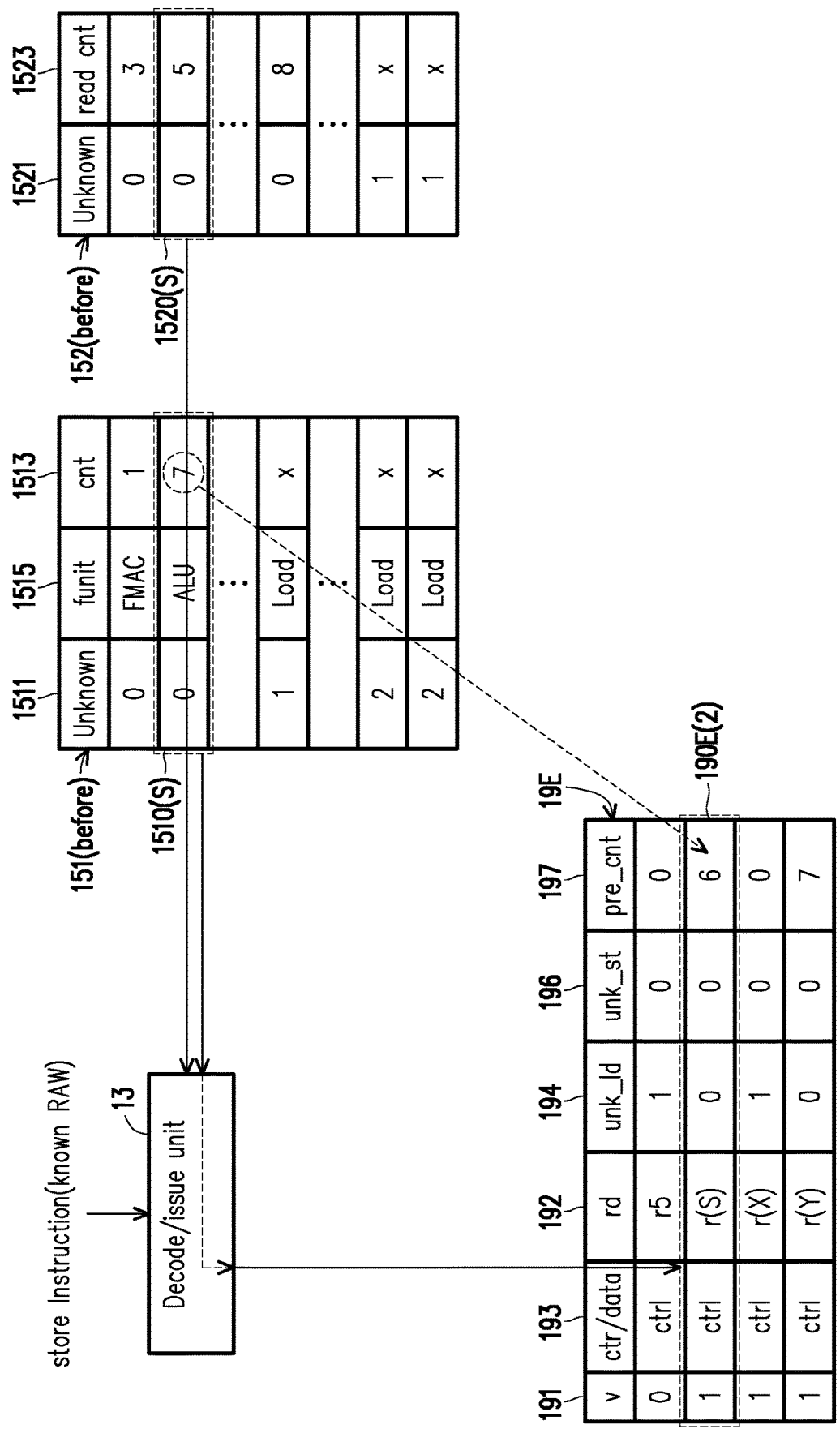

FIGS. 10A and 10B are diagrams illustrating an operation of issuing a store instruction having a RAW data dependency with known access time in accordance with some embodiments. With reference to FIG. 10A, a store instruction (i.e., the second instruction) is received by the decode/issue unit 13, where the store instruction is to store data (e.g., to memory 30) by reading the store data from a register R(S). If the source operand of the store instruction designates the register R(S), the store instruction would have a RAW data dependency with the ALU instruction. Before issuing the store instruction, the decode/issue unit 13 access the first scoreboard 151 to check for data dependency, such as any prior load instructions based on unknown fields 1511 in the first scoreboard 151 or other instructions with known access time (e.g., ALU) based on the write count field 1513. In the embodiments, the scoreboard entry 1510(S) of the first scoreboard 151 indicates that an ALU instruction (i.e., first instruction) will write to register R(S) of the register file 14 in 7 clock cycles based on the information in the write count field 1513 and functional unit field 1515. Since the ALU instruction has a known access time, the store instruction having a RAW data dependency with the ALU instruction may be referred to as RAW data dependency having known access time. In the embodiments, the decode/issue unit 13 issues the store instruction with scoreboard values in the scoreboard entry 1510(S) in the scoreboard 151 to next available DEQ entry (e.g., 190E(2)) of the DEQ 19E.

With reference to the DEQ 19E as illustrated in FIG. 10A, the store instruction would be placed in the (next available) DEQ entry 190E(2), and the fields of the DEQ entry 190E(2) would be configured according to the store instruction and the scoreboard values sent with the store instruction. In detail, the valid field is change to "1" to validate the entry, the execution control data field 193 is changed to store the control data of the store instruction, and the address field 192 is changed to "r(S)" to indicate that the store instruction is to read from the register R(S). Since the store instruction can only have RAW data dependency with a previous instruction that write to R(S), the various scoreboard values recorded in the first scoreboards 151 are sent to the DEQ 19E with the issuing store instruction. It should be noted that the store instruction does not have data dependency with the second scoreboard 152 (i.e., RAR is not a data dependency), the unknown store count in the unknown store field 196 of the execution queue 190E(2) would be 0 for store instruction. For example, values in the unknown field 1511, write count field 1513, recorded in the first scoreboards 151 may be sent to the DEQ 19E. The unknown field 1511 of the scoreboard entry 1510(S) of the first scoreboard 151 would be copied to the unknown load field 194 of the DEQ entry 190E(2). Since the first instruction prior to the store instruction is an ALU instruction which has known access time, the write count value (i.e., "7") of count field 1515 of first scoreboard 151 (before issuing) as illustrated in FIG. 10A would be sent to the DEQ entry 190E(2) with the store instruction, which is used to set the pre-count field 197 of the DEQ entry 190E(2). With reference to DEQ 19E in FIG. 10A, the pre-count value is set to the 6 which is derived from the write count value of 7 in the scoreboard entry 1510(S) before issuing. Since the DEQ entry 190E(2) is set one clock cycle after the write count value of 7 in the write count field 1513 is read, the count value of 7 is decremented by one (i.e., 6) when placing the store instruction in the DEQ entry 190E(2). In other words, the pre-count value in the DEQ entry 190E(2) records the number of clock cycles in the future for the ALU instruction to writeback the result data to the register R(S). The DEQ 190E(2) counts down the pre-count value by one for every clock cycles until the pre-count value reaches 0 which indicates that the RAW data dependency with the previously issued instruction having known access time is no longer valid. The store instruction in the DEQ 190E(2) is dispatched to the load/store unit 17 when the fields 194, 196, and 197 of the DEQ entry 190E(2) are zero. In another embodiment, the pre-count 197 value of 1 indicates that the result data from the ALU are written back to the register file 14 at which time the DEQ entry 190E(2) can be issued to the load/store unit 17 with forwarding data from the ALU. Two other conditions must be satisfied for the DEQ entry 190E(2) to be issued to the load store unit 17: (1) the unknown load count in the unknown load field 194 should be zero and (2) a read port must be available for forwarding of ALU result data which can be preset by the decode/issue unit 13. In some embodiments, the DEQ 19E checks the read port shifter 161 for availability of the read ports.

With reference to FIG. 10B, after the issuing of the store instruction, the decode/issue unit 13 would update the unknown field 1523 of the scoreboard entry 1520(S) in the second scoreboard 152 to indicate that the latest issued instruction is a store instruction having unknown read time to the register R(S). In detail, the unknown value of unknown field 1521 in the scoreboard entry 1520(S) would be incremented by one ("1" as illustrated the unknown field 1521 of the second scoreboard 152 (after) in FIG. 10B).

Figure 11A:
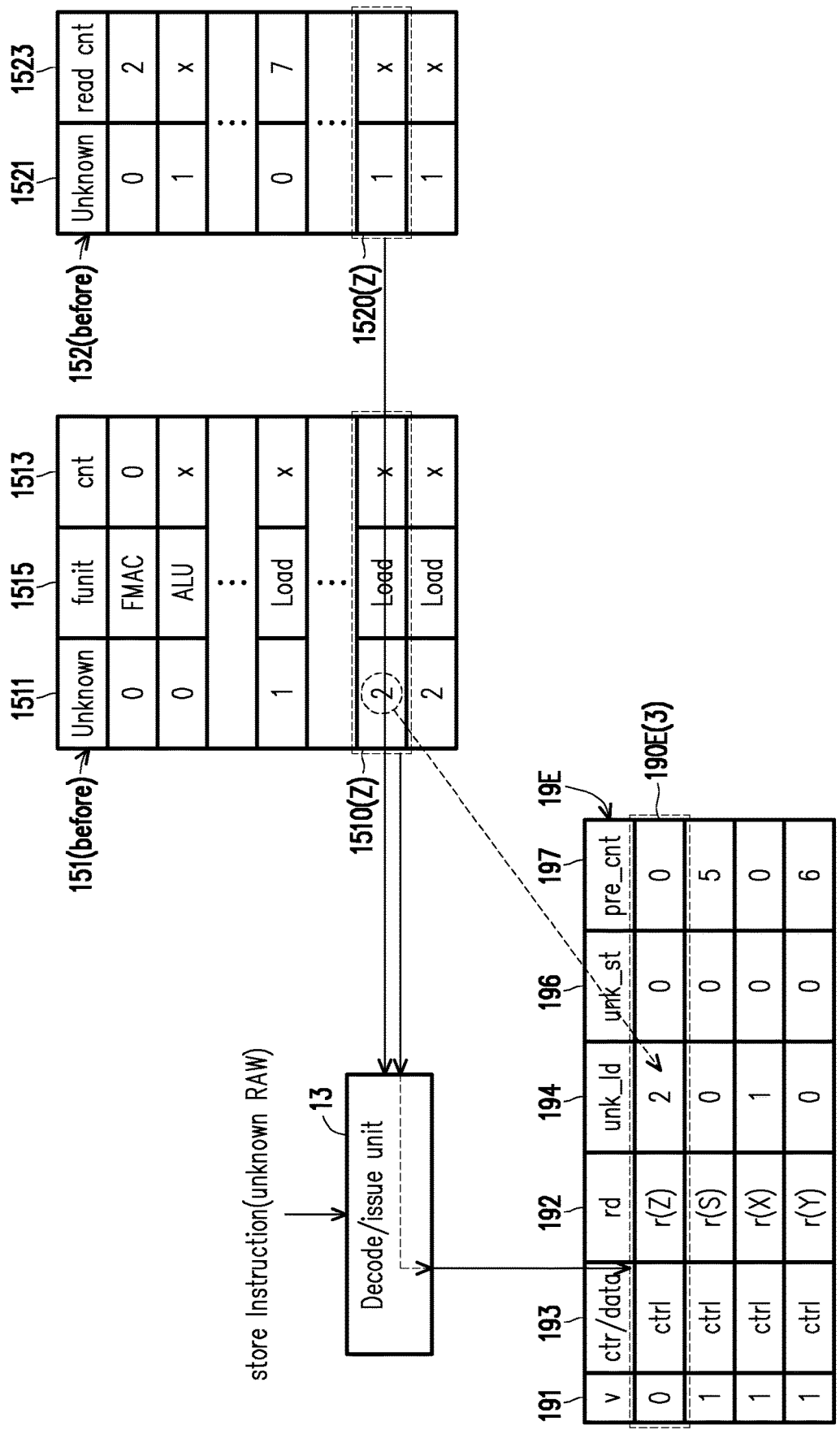

FIGS. 11A and 11B are diagrams illustrating an operation of issuing a store instruction having a RAW data dependency with unknown access time in accordance with some embodiments. With reference to FIG. 11A, a store instruction (i.e., a second instruction) is received by the decode/issue unit 13, where the store instruction is to read store data from the register R(Z) to write to DA 24. Before issuing the store instruction, the decode/issue unit 13 accesses the first scoreboard 151 (i.e., scoreboard entry 1510(Z) to check for data dependency, such as any prior load instructions based on unknown fields 1511 in the first scoreboard 151 or other instructions with known access time based on the write count field 1513. The scoreboard entry 1510(Z) indicates that there are two prior load instructions (i.e., first instructions) having unknown access time for writing to the register R(Z) of the register file 14 based on the unknown field 1511 ("2") of the scoreboard entry 1510(Z), and the scoreboard entry 1520(Z) indicates that there is one prior store instruction (i.e., first instruction) having unknown access time for reading from the register R(Z) of the register file 14. The store instruction having a RAW data dependency with the prior load instructions may be referred to as RAW data dependency having unknown access time. In the embodiments, the decode/issue unit 13 issues the store instruction with scoreboard values in the scoreboard entry 1510(Z) in the scoreboard 151 to next available DEQ entry (e.g., 190E(3)) of the DEQ 19E.

With reference to the DEQ 19E as illustrated in FIG. 11A, the store instruction would be allocated to the (next available) DEQ entry 190E(3), and the fields of the DEQ entry 190E(3) would be configured according to the store instruction and the scoreboard values that was sent with the store instruction. In detail, the valid field is change to "1" to validate the entry, the execution control data field 193 is changed to store the control data of the store instruction, the address field 192 is changed to "r(Z)" to indicate that the store instruction is to read from the register R(Z). The values in the write unknown field 1511 and the write count field 1513 of the scoreboard 151 are used to set the fields 194 and 197 in the DEQ entry 190E(3). The field 196 in the DEQ entry 190E(3) must be 0 for store instruction. In detail, the value (i.e., a value of "2") in the write unknown field 1511 of the first scoreboard 151 is copied to the unknown load field 194 as the unknown load count. In the embodiments, the pre-count field 197 would be 0 since the unknown field 1511 of entry 1510(Z) is set. The execution queue 19E keeps the unknown load count and monitors the dedicated write port (one of the result buses 32) for writeback operation to the register R(Z) to decrement the unknown load count in the DEQ 19E in the same manner as the first scoreboard 151. In some embodiment, the load/store unit 17 may send the writeback signal along with register R(Z) to the DEQ 19E and the first scoreboard 151 to decrement the unknown load count. As described above, the DEQ 19E would have to wait until the unknown load count, the unknown store count and the pre-count value of a DEQ entry reach 0 before dispatching the load/store instruction corresponding to the DEQ entry to the load/store unit 17. In another embodiment, the writeback signal from the load/store unit 17 indicates that the load result data are written back to the register file 14 at which time the DEQ entry 190E(3) can be issued to the load/store unit 17 with forwarding data from the load/store unit 17. Two other conditions must be satisfied for the DEQ entry 190E(3) to be issued to the load store unit 17: (1) the unknown load count in the unknown load field 194 should be one and (2) a mechanism to forward the load result data by using a read port or by using an internal bus of load/store unit 17. In some embodiments, the DEQ 19E checks the read port shifter 161 for availability of the read ports.

With reference to FIG. 11B, after the issuing of the store instruction, the decode/issue unit 13 would update the read unknown field 1521 of the scoreboard entry 1520(Z) to indicate that the latest issued instruction is store instruction having unknown read time to the register R(Z). In detail, the unknown value of unknown field 1521 in the scoreboard entry 1520(Z) would be incremented by one (i.e., becoming a value of "2").

In the following, embodiments are illustrated to show the issuing of a second instruction in a condition where at least one register to be written by the second instruction has WAR data dependency with a first instruction that is to read from the at least one register in a future time, where the first instruction may have known read time or unknown read time. In general, the decode/issue unit 13 would access both the first and second scoreboard 151, 152, where scoreboard information from both of first and second scoreboards 151, 152 are sent to the DEQ 19E with the second instruction to configure the DEQ entry. After the issuing of the second, the corresponding entry of the first and second scoreboards 151, 152 may be updated. In one of the embodiments, only the write unknown field 1511 in the first scoreboard 151 is updated to indicate that the corresponding register has a previously issued instruction that has unknown write time, since the second instruction (load) is to write back to the corresponding register. However, the disclosure is not intended to limited thereto. In other embodiments, more fields of the scoreboard entry may be updated recording the information of the issued second instruction. For example, the functional unit field 1515 may also be updated to record a load instruction that is to write to the corresponding register has unknown access time.

Figure 12A:
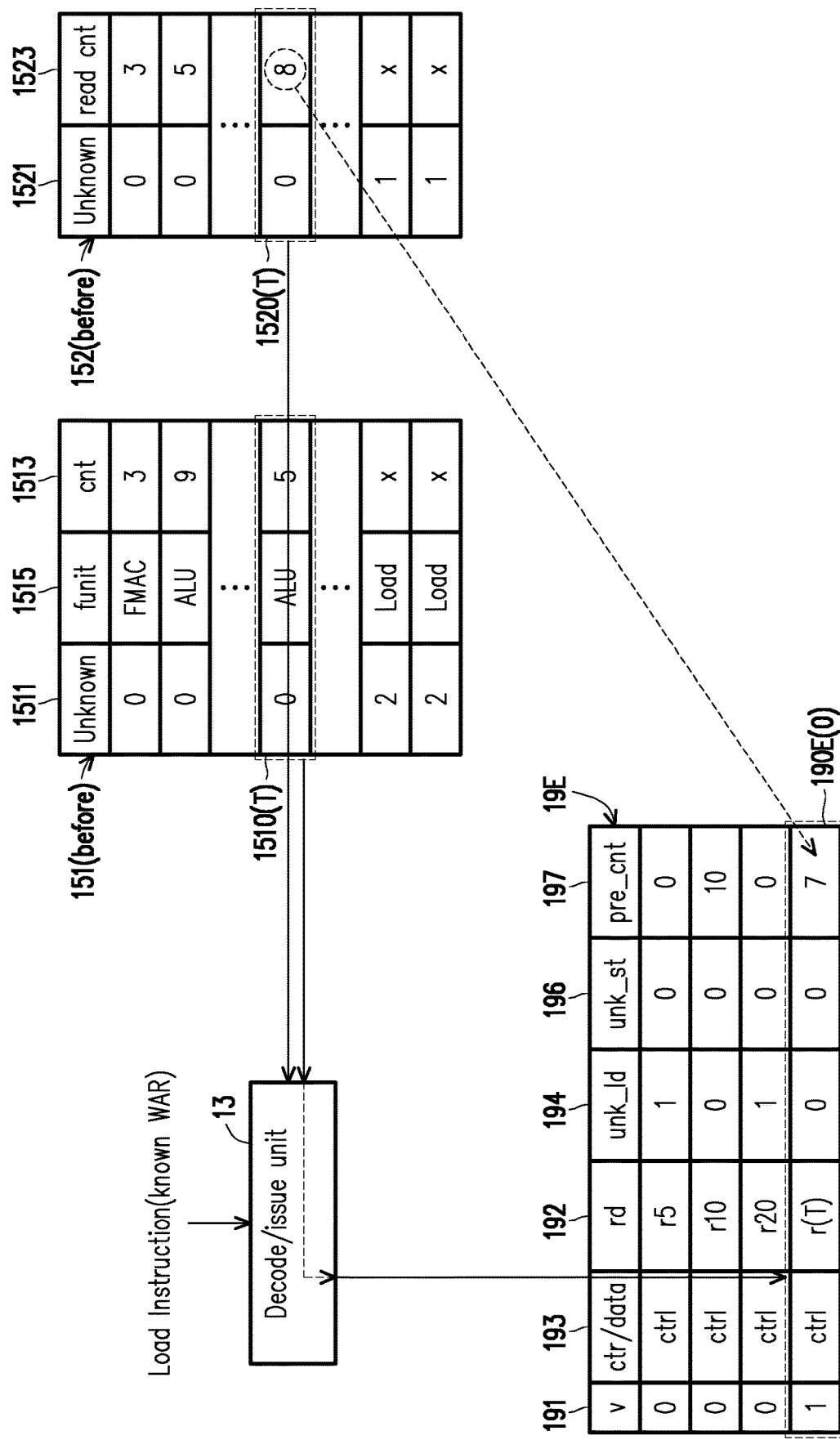

FIGS. 12A and 12B are diagrams illustrating an operation of issuing a load instruction having a WAR data dependency with known access time in accordance with some embodiments. In the embodiment of handling WAR data dependency, a load instruction (i.e., second instruction) is received by the decode/issue unit 13, where the load instruction is to write the load data to a register R(T), and T is greater than 1 and less than N. Before issuing the load instruction, the decode/issue unit 13 access the scoreboard entries 1510(T), 1520(T) to check for data dependency. The read count field 1523 of scoreboard entry 1520(T) indicates that there is a previously issued instruction (i.e., first instruction) that is scheduled to read from the register R(T) in 8 clock cycles. The write count field 1513 of scoreboard entry 1510(T) indicates that there is another previously issued instruction (i.e., also referred to as one of the first instructions) that is scheduled to write to the register R(T) in 5 clock cycles. Since the read time is greater than the write time, the issue instruction is based on the read count field 1523 of scoreboard entry 1520(T) and ignore the write count field 1513 of scoreboard entry 1510(T). Such case may be referred to as a WAR data dependency having known read time at the issue time of the load instruction. In the embodiments, the decode/issue unit 13 issues the load instruction with scoreboard values in the scoreboard entry 1520(T) in the second scoreboard 152 (illustrated as 152 (before) in FIG. 12) to the next available DEQ entry (e.g., 190E(0)) of the DEQ 19E.

With reference to the DEQ 19E as illustrated in FIG. 12A, the load instruction would be allocated to the (next available) DEQ entry 190E(0), and the fields of the DEQ entry 190E(0) would be configured according to the load instruction and the scoreboard values that was sent with the load instruction. In detail, the unknown values in the unknown fields 1511, 1521 of the scoreboard entries 1510(T), 1520(T) would be copied to the unknown load field 194 and unknown store field 196, respectively. Since the load instruction has an unknown write time to the register R(T), it is important for the DEQ entry 190E(0) to ensure that the first instruction has read the register R(T) before the load instruction writes to the register R(T). Therefore, the read count value of read count field 1523 before the issuing of load instruction would be used to set the pre-count field 197 of the DEQ entry 190E(0). Since the DEQ entry 190E(0) is set one clock cycle after the read count value of 8 in the read count field 1523 is read, the read count value of 8 is decremented by one (i.e., 7) when placing the load instruction to the DEQ entry 190E(0) in the DEQ entry 190E(0). In other words, the pre-count value in the DEQ entry 190E(0) records the number of clock cycles in the future for the first instruction to read the data from the register R(T). In another embodiment, the pre-count value 197 may further decrement by the minimum latency time of the load instruction, i.e., if the minimum latency time of the load instruction is 3 cycles (instead of 1 cycle), then the pre-count value 197 is set to 5. Basically, the load instruction can only write back to the R(T) at the earliest time of 9 cycles from the issue time. As noted before, the DEQ 19E would have to wait until the unknown load count, the unknown store count and the pre-count value of a DEQ entry reach 0 before dispatching the load/store instruction corresponding to the DEQ entry to the load/store unit 17.

With reference to FIG. 12B, after issuing of the load instruction, the decode/issue unit 13 would update the unknown field 1511 of the scoreboard entry 1510(T) to indicate that the latest issued instruction is a load instruction having unknown access time for writing back to the register R(T). In detail, the unknown value of unknown field 1511 in the scoreboard entry 1510(T) would be incremented by one (i.e., becoming a value of "1"). The functional unit field 1515 should be changed to "load" for recording the operation of the second instruction.

Figure 13A:
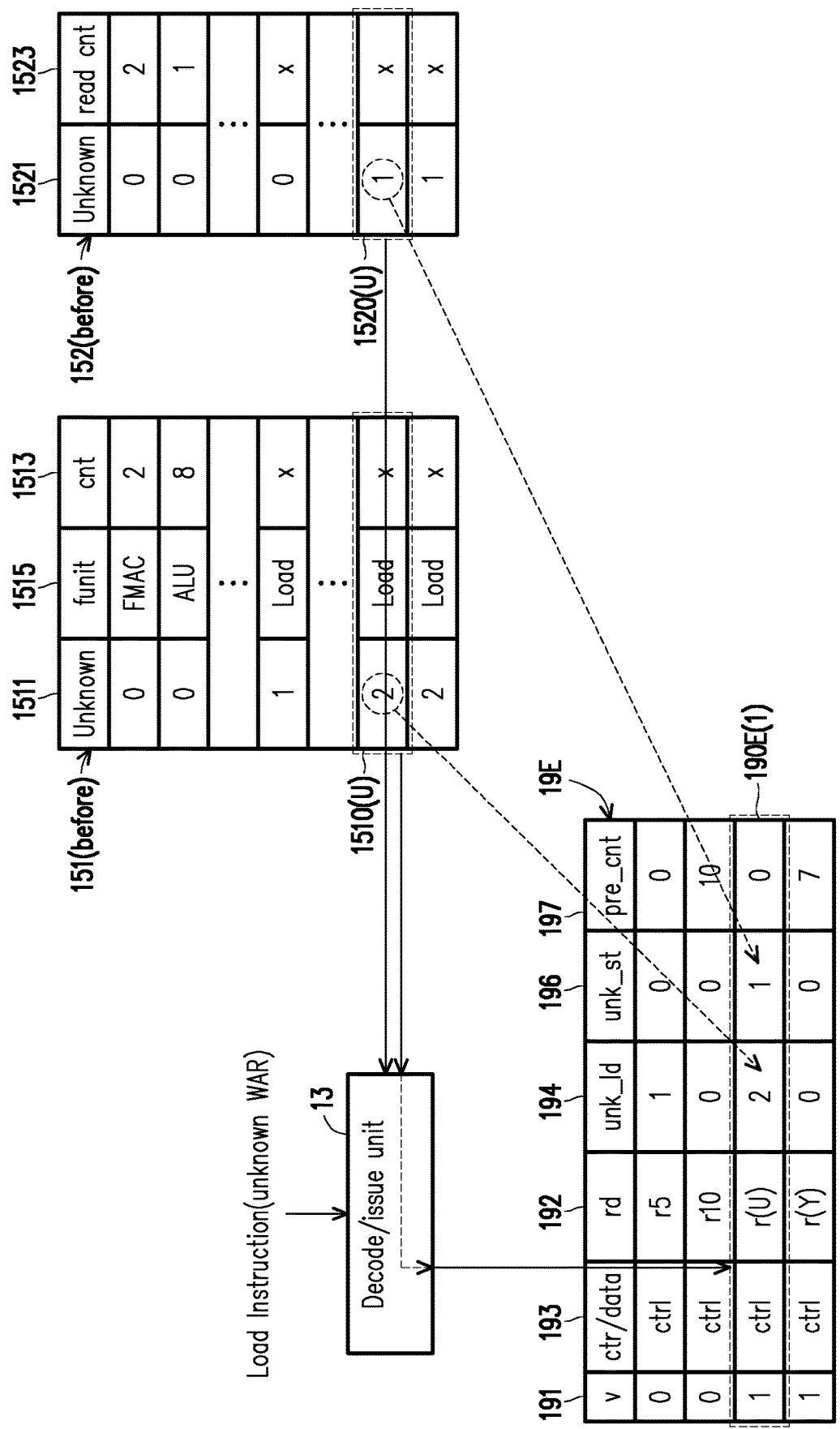

FIGS. 13A-13B are diagrams illustrating an operation of issuing a load operation having a WAR data dependency with unknown access time in accordance with some embodiments. In the embodiments, a load instruction (i.e., a second instruction) is received by the decode/issue unit 13, where the load instruction is to write back the load data to a register R(U). Before issuing the load instruction, the decode/issue unit 13 access the scoreboard entries 1510(U), 1520(U) to check for data dependency. The scoreboard entry 1510(U) indicates that there are two prior load instructions (i.e., two of first instructions) writing to register R(U) of the register file 14 based on the unknown field 1511 ("2") of the scoreboard entry 1510(U), which indicates that the load instruction to be issued has a WAW data dependency with the two prior load instruction. The scoreboard entry 1520(U) indicates that there is a prior store instruction (i.e., one of first instructions) reading from register R(U) of the register file 14 based on the unknown field 1521 ("1") of the scoreboard entry 1520(U), which indicates that the load instruction to be issued has a WAR data dependency with the prior store instruction. Since each of the scoreboard entries 1510(U), 1520(U) records at least one prior instruction having unknown access time, the values in the write\read count fields 1513, 1523 may not be used to configure the pre-count field 197 in the DEQ entry 190E(1). In the embodiments, the decode/issue unit 13 issues the load instruction with scoreboard values in the scoreboard entries 1510(U), 1520(U) in the first and second scoreboard 151, 152 to next available DEQ entry (e.g., 190E(1)) of the DEQ 19E.

With reference to the DEQ 19E as illustrated in FIG. 13A, the load instruction would be allocated to the (next available) DEQ entry 190E(1), and the fields of the DEQ entry 190E(1) would be configured according to the load instruction and the scoreboard values that was sent with the load instruction. In detail, the valid field is change to "1" to validate the entry, the execution control data field 193 is changed to store the control data of the load instruction, the address field 192 is changed to "r(U)" to indicate that the second load instruction is to writeback to the register R(U). The unknown value in the unknown field 1511 of scoreboard entry 1510(U) would be copied to the unknown load field 194 of the DEQ entry 190E(1) as the unknown load count. The unknown value in the unknown field 1521 of scoreboard entry 1520(U) would be copied to the unknown store field 196 of the DEQ entry 190E(1) as the unknown store count. In the embodiments, the pre-count field 197 would be 0 since the prior load and store instructions each has unknown access time because the unknown fields 1511, 1521 of the scoreboard entries 1510(U), 1520(U) are set. The execution queue 19E monitors the reserved read bus(es) 31 for reading of register R(U) to decrement unknown store count of the unknown store field 196 in the DEQ 19E in the same manner as the scoreboard 152. The execution queue 19E also monitors the reserved result bus(es) 32 for write operation of register R(U) to decrement unknown load count of the unknown load field 194 in the DEQ 19E in the same manner as the scoreboard 151. In some embodiment, the load/store unit 17 may send the read signal along with register R(U) to the DEQ 19E and the scoreboard 152 for decrement of the unknown store count and the unknown read count. As noted before, the DEQ 19E would have to wait until the unknown load count, the unknown store count and the pre-count value of a DEQ entry reach 0 before dispatching the load/store instruction corresponding to the DEQ entry to the load/store unit 17.

With reference to FIG. 13B, after the issuing of the load instruction, the decode/issue unit 13 would update the unknown field 1511 of the scoreboard entry 1510(U) to indicate that the latest issued instruction is a load instruction having unknown write time to the register R(U). In detail, the unknown value of unknown field 1511 in the scoreboard entry 1510(U) would be incremented by one (i.e., becoming a value of "3"). It should be noted that if another load instruction writing to the register R(U) is received by the decode/issue unit 13 with unknown value of "3" in 151 (after) in FIG. 13B), the decode/issue unit 13 may stall the issuing of the newly received load instruction since the unknown write count of unknown field 1511 is equal to or greater than a predetermined unknown value (e.g., "3").

Figure 14A:
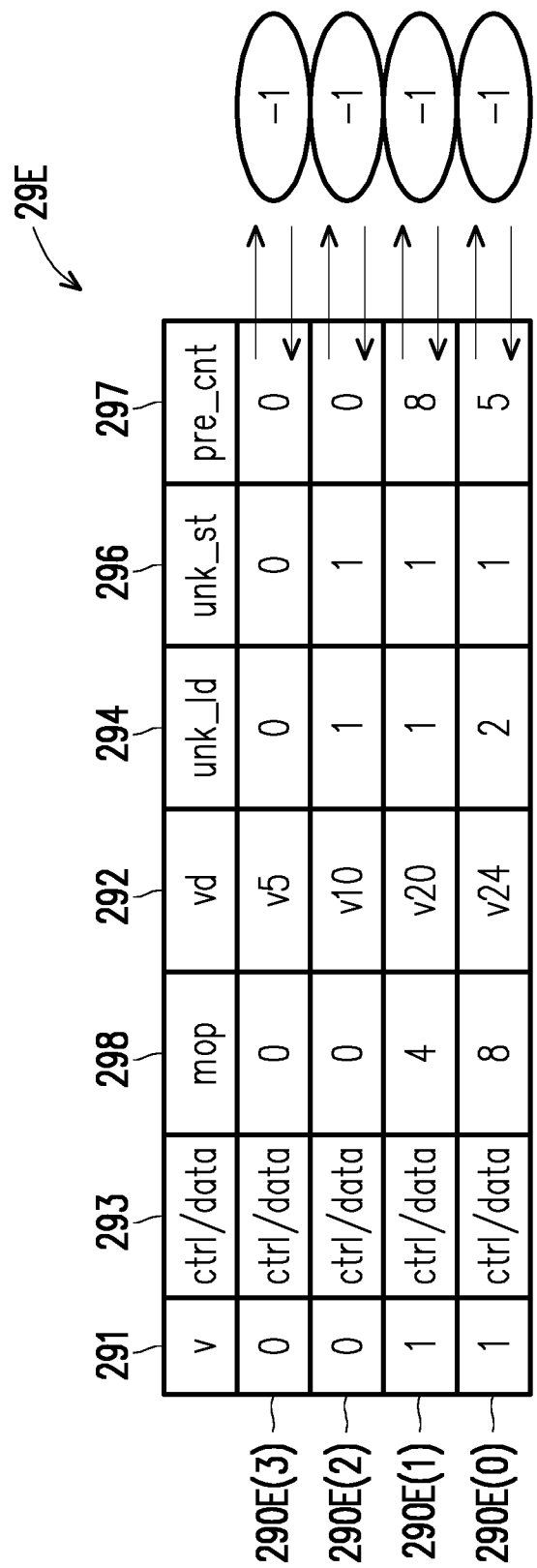

FIGS. 14A-14C are diagrams illustrating vector load/store instructions in accordance with some embodiments of the disclosure. Data execution queue (DEQ) 29E is used to handle vector load/store instructions. The load/store instructions recorded in the DEQ 29E are vector load/store vector instructions that includes a plurality of load/store micro-ops. Each of the load/store micro-ops is configured to perform a load or a store to at least one register of the vector register file. With reference to FIG. 14A, the DEQ 29E includes a plurality of DEQ entries 290E(0)-290E(3) that record various information of the queued load/store instructions in an order of which the load/store instruction is received. It should be noted that the embodiment is not intended to limit the number of the DEQ entries, other embodiments may include more or less DEQ entries. Each DEQ entry corresponds to one queued load/store instruction and includes a valid field 291 ("v"), an execution control data field 293 ("ctrl/data"), an address field 292 ("vd"), an unknown load field 294 ("unk_ld"), an unknown store field 296 ("unk_st"), and a pre-count field 297 ("pre_cnt"), where the function and operation of these fields are similar to the fields of the DEQ 19E as illustrated in FIG. 7. In the embodiments, the DEQ 29E further includes a micro-op field ("mop") 298 to record a plurality of micro-operations in each load/store instruction. The fields of the DEQ entries are set when the load/store instruction(s) is received from the decode/issue unit 13 (i.e., one clock cycle after the issue time of the instruction in the decode/issue unit). FIG. 7 illustrates an execution queue used for a load/store instruction with 1 micro-op while execution queue illustrated in FIGS. 14A-14C are for a vector load/store instruction with multiple micro-ops. The DEQ must be expanded to handle known and unknown data dependency for each micro-op of a vector load/store instruction. The operation of each micro-op of the vector load/store instruction would be similar to the operation and process as illustrated in FIGS. 8-13, and thus the detail description of the operation of handling the micro-op would be omitted here for the purpose of brevity. The DEQ entry may be reset (invalided) when the corresponding load/store instruction (all micro-ops) is dispatched to the load/store unit 17.

With reference to FIGS. 14B-14C, each DEQ entry 290E (0)-290E(3) is configured to record the address information, unknown load information, and unknown store information for each micro-operation For example, the load/store instructions in DEQ entry 290E(0) includes 8 micro operations, and the load/store instructions in the DEQ entry 290E(1) has 4 micro operations. With reference to FIG. 14B, the address field 292(0), the unknown load field 294(0), and the unknown field 296(0) are expanded to have 8 sets of data to handle 8 micro-operations in the DEQ entry 290E(0). With reference to FIG. 14C, the address field 292(1), the unknown load field 294(1), and the unknown field 296(1) are expanded to have 4 sets of data to handle 4 micro-operations in the DEQ entry 290E(1).

Similar to the DEQ 19E in FIG. 7, the address field 292 records a register address of a vector register in the vector register file (not shown) which are accessed by the vector load/store instruction. The vector register is much wider than the scalar register of the register file 14. For example, the scalar register is 64-bit for a single element of 64-bit while the vector register is 512-bit which may represent as an example of 8 elements of 64-bit or 64 elements of 8-bit. The number of micro-ops refers to multiple consecutive vector registers. For example, a register value of "v24" in the address field 292 of a vector load/store instruction in the DEQ entry 290E(0) represents the register address v24 thru v31 which will be access by 8 micro-ops as illustrated in FIG. 14B. The a register value of "v20" in the address field 292 of the load/store instruction in the DEQ entry 290E(1) will access the register address v20 thru v23 by 4 micro-ops as indicated in FIG. 14C. The DEQ 29E calculates the other valid vector registers based on the specified first vector registers v24 and v20 in the address field 292 and the number of micro-ops in "mop" field 298.

In some embodiments, each micro-op is treated as an independent instruction. With reference to FIGS. 14B and 14C, each micro-op would have an address field 292(0), 292(1), unknown load field 294(0), 294(1), an unknown store field 296(0), 296(1), and a pre-count field 297(0), 297(1). The count field 297(0), 297(1) of each micro-op in entry 290E(0) and 290E(1) is configured to records the largest count value (e.g., write or read time of prior first instructions) among the registers to which the micro-ops of the vector load/store instruction are to access (known RAW, WAW, or WAR data dependency). For example, the count field 297(0) of the entry 290E(0) may record 8 count values corresponding to 8 load/store micro-ops of the load/store vector instruction recorded in the DEQ entry 290E(0). The count values recorded in the count field 297(0) are counted down every clock cycle until the count values reach 0. The load/store queue 29E may separately dispatch the load/store micro-ops of the load/store vector instruction to the load/store unit 17 based on the count values corresponding to load/store micro-ops. Note that the unknown fields 294(0) and 296(0) for each micro must also be zero in order for each micro-op to be dispatched to the load/store unit 17.

In an alternate embodiment, the 8 count fields 297(0) of the load/store instruction in entry 290E(0) may be combined to record a single largest known pre-count value. That is, all micro-ops in the same entry, e.g. 290E(0), shares a single pre-count field 297 which records the largest known data dependency of all micro-ops. The count value is counted down by one for every clock cycle until the count value reaches 0. All load/store micro-ops of the load/store vector instruction can be dispatched to the load/store unit 17 for execution when the count value reaches 0. Note that the unknown fields 294(0) and 296(0) must also be zero in order for each micro-op to be dispatched to the load/store unit 17.

In some embodiments, the load/store instruction recorded in the load/store queue 29E is a load/store vector instruction that includes a plurality of load/store micro-ops for assessing specific registers, in which the data dependencies (e.g., WAW, WAR, RAW data dependencies) on the specific registers are unknown data dependencies. In other words, the timings for resolving the data dependencies are unknown. In the DEQ 29E, each register of micro-ops in each DEQ entry must monitors the dedicated write port (as part of the result bus(es) 32) for specific vector register written back to the vector register file and decrement the unknown load field 294 accordingly in the same manner as the scoreboard 151. Similarly, each micro-op register in each DEQ entry must monitors the reserved read bus(es) 31 for specific vector register read from the vector register file and decrement the unknown store field 296 accordingly in the same manner as the scoreboard 152. In some embodiment, the load/store unit 17 may send the writeback signal along with write register and read signals along with read register to the DEQ 29E, the first scoreboard 151, and the second scoreboard 152 to decrement the unknown counts in the DEQ entries. For example, the first entry 190E(0) in FIG. 14B has 8 monitors for 8 vector registers, i.e., v24 thru v31, on the dedicated write port as part of the result bus(es) 32 for specific vector registers writing back to the vector register file and decrements the value in the unknown load fields 294(0) if there is a match. At the same time, the first entry 290E(0) in FIG. 14B may have 8 monitors for 8 vector registers, v24 thru v31, on the reserved read bus(es) 31 for reading of specific vector registers from the vector register file and decrements the value in the unknown store fields 296(0) if there is a match. As noted before, each micro-op in the DEQ 29E(0) would have to wait until the unknown load count 294(0), the unknown store count 296(0) and the pre-count value 297(0) of a DEQ entry 290E(0) to reach 0 before dispatching the load/store micro-op corresponding to the load/store unit 17. The DEQ 29E with 4 valid entries can have up to 32 monitors for the dedicated write port as part of the result bus(es) 32 and 32 monitors for the reserved read bus(es) 31 from the vector register file. In some embodiments, the micro-ops are dispatched in order to the load/store unit 17. The first entry 290E(0) of the DEQ 29E in FIG. 14B issues the first micro-op with the vector register v24 when the corresponding the first unknown load field 294(0), the first unknown store field 296(0), and the pre-count field 297(0) are zeros. The mop field 298 is decremented by 1 when the first micro-op is issued. The second micro-op with the vector register v25 is issued when the corresponding the second unknown load field 294(0), the second unknown store field 296(0), and the pre-count field 297(0) are zeros. The mop field 298 is decremented by 1 when the second micro-op is issued. When the mop field is zero, then all 8 micro-ops from the first entry 290E(0) are dispatched to the load/store unit 17 and the first entry is invalidated and the micro-ops of the second entry, 290E(1) in FIG. 14C, can be issued when the corresponding unknown load field 294(1), unknown load field 296(1), and pre-count field 297(1) are zeros.

In accordance with the above embodiments, a scoreboard of the microprocessor may record unknown fields for instructions with unknown write and read times and count fields for instructions with known write and read times. The load/store instruction with data dependency (e.g., WAW, WAR, RAW dada dependencies) on the known write and read times of the previous instructions are referred to as known data dependency. The load/store instruction with data dependency (e.g., WAW, WAR, RAW dada dependencies) on the unknown write and read times of the previous instructions are referred to as unknown data dependency. The load/store instructions with both types of data dependencies can be issued immediately to the load/store queue instead of being stalled in the decode/issue unit. In this way, the performance of the microprocessor is improved. In addition, the load/store instruction may be a scalar load/store instruction or a load/store vector instruction that include a plurality of load/store micro-ops.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A microprocessor, comprising:
a register file, comprising a plurality of registers;
a scoreboard, comprising a plurality of scoreboard entries, wherein each scoreboard entry corresponds to one of the registers and comprises respective scoreboard information related to the corresponding register, wherein a first scoreboard entry corresponding to a first register includes first scoreboard information related to a first instruction issued and scheduled to access the first register;
a decode/issue unit, issuing a second instruction accessing the first register scheduled to be accessed by the first instruction in which the first scoreboard information of the first scoreboard entry is attached with the second instruction;
a load/store queue, receiving the second instruction and the first scoreboard information of the first register from the decode/issue unit and resolving a data dependency based on the first scoreboard information of the first register; and
a load/store unit, receiving and executing the second instruction issued from the load/store queue,
wherein the first scoreboard information of the first scoreboard entry corresponding to the first register records an unknown value representing whether the first instruction has unknown access time for accessing the first register,
wherein the load/store queue includes a tag execution queue and a data execution queue,
wherein the second instruction is issued as a plurality of micro-ops including a first micro-op and a second micro-op, the first micro-op is dispatched to the tag execution queue to calculate a memory address and accesses a tag array of a data cache, and the second micro-op is dispatched to the data execution queue to access a data array of the data cache,
wherein the tag execution queue is independent from the data execution queue, and the data execution queue utilizes a cache hit or miss from the first micro-op in the tag execution queue to access the data array of the data cache.

2. The microprocessor of claim 1, wherein the decode/issue unit is further configured to increment the unknown value recorded as the first scoreboard information of the first scoreboard entry corresponding to the first register after the second instruction is issued to the load/store unit.

3. The microprocessor of claim 2, wherein the unknown value of the first scoreboard entry includes an unknown write value and an unknown read value, wherein the unknown write value is incremented when the second instruction is a load instruction which writes back to the first register, and the unknown read value is incremented when the second instruction is a store instruction which reads from the first register.

4. The microprocessor of claim 2, wherein the first instruction includes a plurality of first instructions issued prior to the second instruction, and the decode/issue unit is further configured to stall the issuing of the second instruction in response to the unknown value of the first scoreboard entry being greater than a predetermined unknown value.

5. The microprocessor of claim 1, wherein the first scoreboard information attached to the second instruction includes an unknown value representing that the first instruction has an unknown access time for accessing the first register, and
the load/store queue records the unknown value of the first scoreboard information attached to the second instruction in a queue entry of the load/store queue corresponding to the second instruction as an unknown count, decrements the unknown count by one when a writeback operation to the first register or a read operation to the first register is detected, and dispatches the second instruction to the load/store unit when the unknown count reaches 0.

6. The microprocessor of claim 5, wherein the scoreboard includes a first scoreboard and a second scoreboard, and the respective scoreboard information includes a first unknown value from the first scoreboard and a second unknown value from the second scoreboard,
wherein the unknown count of the queue entry includes an unknown load count and an unknown store count, the load/store queue records the first and second unknown values of the respective scoreboard information as the unknown load count and the unknown store count respectively when the second instruction is a load instruction, and
wherein the load/store queue records the first unknown value as the unknown load count when the second instruction is a store instruction.

7. The microprocessor of claim 5, wherein the writeback operation to the first register is detected by monitoring a writeback bus, and the read operation is detected by monitoring a read bus.

8. The microprocessor of claim 5, wherein a functional unit provides a writeback signal representing the writeback operation to the first register or a read signal representing the read operation to the first register.

9. The microprocessor of claim 1, wherein the first instruction has known access time, the first scoreboard information attached with the second instruction further includes a count value representing a number of clock cycles for the first instruction to access the first register, and
the load/store queue sets a pre-count value in a queue entry of the load/store queue corresponding to the second instruction based on the count value, decrements the pre-count value by one for every clock cycle, and dispatches the second instruction to the load/store unit according to the pre-count value.

10. The microprocessor of claim 9, wherein the second instruction is a load instruction,
the load/store queue sets the pre-count value in a queue entry of the load/store queue corresponding to the second instruction based on a write time for the first instruction to write back to the first register, read time for the first instruction to read from the first register, or a minimum latency time of the load instruction, and the second instruction is dispatched to the load/store unit when the pre-count value reaches 0.

11. The microprocessor of claim 9, wherein the second instruction is a store instruction, the pre-count value is set to the write time for the first instruction to write back to the first register, and the second instruction is dispatched to the load/store unit when the pre-count value reaches 1 at which data is forwarded from a functional unit corresponding to the first instruction to the load/store unit in a next clock cycle.

12. The microprocessor of claim 1,
wherein the second instruction comprises a plurality of micro-ops having data dependencies with the first instruction having a known access time,
wherein the load/store queue comprises a plurality of queue entries, and each of the plurality of queue entries includes:
an address field storing a first vector register address of a first micro-op of the plurality of micro-ops in the load/store queue, and subsequent addresses of subsequent micro-ops are calculated from the first vector register address, and a pre-count field storing a pre-count value, wherein the pre-count value is decremented by one for every clock cycle until it reaches 0, and
the load/store queue dispatches a plurality of load/store micro-ops to the load/store unit when the pre-count value in the pre-count field reaches 0.

13. The microprocessor of claim 12,
wherein the pre-count value includes a plurality of micro-op pre-count values corresponding to the plurality of load/store micro-ops, wherein each of the micro-op pre-count values is decremented for every clock cycle until the micro-op pre-count value reaches 0, wherein each of the micro-op pre-count values is a write time for the first instruction to write back to the register, read time for the first instruction to read from the first register, or a largest value of the write time and the read time, and
wherein the load/store queue dispatches one of the plurality of load/store micro-ops to the load/store unit when the corresponding micro-op pre-count value reaches 0.

14. The microprocessor of claim 1,
wherein the second instruction comprises a plurality of load/store micro-ops having data dependencies with the first instruction having an unknown access time,
wherein the load/store queue comprises a plurality of queue entries, each of the plurality of queue entries includes:
an unknown load field recording a plurality of micro-op unknown write values for each of the plurality of load/store micro-ops, and
an unknown store field of the load/store queue recording a plurality of micro-op unknown read values for each of the plurality of load/store micro-ops,
wherein the load/store queue dispatches one of the plurality of load/store micro-ops to the load/store unit when the micro-op unknown write value and the micro-op unknown read value of the corresponding micro-op reach 0.

15. A method of issuing an instruction having an unknown access time, adapted to a microprocessor comprising a scoreboard, wherein the scoreboard comprises a plurality of scoreboard entries, and each of the plurality of scoreboard entries corresponds to one of a plurality of registers and comprises information related to a first instruction previously issued and scheduled to access the corresponding register, comprising:
accessing the scoreboard entry corresponding to a register designated by a second instruction; and
issuing the second instruction to a load/store queue with the information recorded in the scoreboard entry corresponding to the register designated by the second instruction,
wherein a first scoreboard information of a first scoreboard entry corresponding to a first register records an unknown value representing whether the first instruction has unknown access time for accessing the first register,
wherein the load/store queue includes a tag execution queue and a data execution queue,
wherein the second instruction is issued as a plurality of micro-ops including a first micro-op and a second micro-op, the first micro-op is dispatched to the tag execution queue to calculate a memory address and accesses a tag array of a data cache, and the second micro-op is dispatched to the data execution queue to access a data array of the data cache, wherein the tag execution queue is independent from the data execution queue, and the data execution queue utilizes a cache hit or miss from the first micro-op in the tag execution queue to access the data array of the data cache.

16. The method of claim 15, further comprising:

setting an unknown field in a queue entry based on an unknown value in the scoreboard entry corresponding to the register designated by the second instruction, decrementing the unknown field of the queue entry in response to a detection of read data for the register designated by the second instruction on a read bus or a detection of result data for the register designated by the second instruction on a result bus, and dispatching the second instruction to a load/store unit when a value of the unknown field of the queue entry is 0.

17. The method of claim 15, further comprising:

setting a pre-count field in a queue entry based on a count value in the scoreboard entry corresponding to the register designated by the second instruction;

decrementing the pre-count field of the queue entry by one for every clock cycle; and dispatching the second instruction to a load/store unit when a value of the pre-count field of the queue entry is 0.

18. The method of claim 17, wherein the pre-count field in the queue entry is further configured based on a latency of the second instruction.

19. The method of claim 15, further comprising:

stalling the issuing of the second instruction in response to a determination of an unknown value in the scoreboard entry corresponding to the register designated by the second instruction being equal to or greater than a predetermined unknown value.

* * * * *